United States Patent
Lickfelt et al.

(10) Patent No.: US 10,855,113 B2
(45) Date of Patent: Dec. 1, 2020

(54) KEYLESS ENTRY DEVICE AND METHOD FOR POWERING THE KEYLESS ENTRY DEVICE

(71) Applicants: Honda Motor Co., Ltd., Tokyo (JP); Continental, Regensburg (DE)

(72) Inventors: Brian K. Lickfelt, Powell, OH (US); Kentaro Yoshimura, Dublin, OH (US); Michael Spannbauer, Regensburg (DE); Dirk Groeger, Regensburg (DE); Ulrich Stetter, Regensburg (DE)

(73) Assignees: Honda Motor Co., Ltd., Tokyo (JP); Continental, Regensburg (DE)

( * ) Notice: Subject to any disclaimer, the term of this patent is extended or adjusted under 35 U.S.C. 154(b) by 0 days.

(21) Appl. No.: 16/579,212

(22) Filed: Sep. 23, 2019

(65) Prior Publication Data

US 2020/0021141 A1    Jan. 16, 2020

Related U.S. Application Data

(63) Continuation of application No. 14/745,744, filed on Jun. 22, 2015, now Pat. No. 10,454,315.

(Continued)

(51) Int. Cl.
*H02J 50/20* (2016.01)
*H02J 7/04* (2006.01)
(Continued)

(52) U.S. Cl.
CPC .......... *H02J 50/20* (2016.02); *G07C 9/00174* (2013.01); *H02J 7/04* (2013.01);
(Continued)

(58) Field of Classification Search
CPC ... H02J 7/0054; H02J 7/1423; Y02T 10/7005; Y02T 10/7044; Y02T 10/705
(Continued)

(56) References Cited

U.S. PATENT DOCUMENTS 3,614,581 A    10/1971    Frost
3,629,680 A    12/1971    Baynes et al.
(Continued)

FOREIGN PATENT DOCUMENTS

JP    H02276426 A    11/1990

*Primary Examiner* — David V Henze-Gongola
*Assistant Examiner* — Tarikh Kanem Rankine
(74) *Attorney, Agent, or Firm* — Rankin Hill & Clark LLP

(57) ABSTRACT

A keyless entry device and method for powering the keyless entry system, such as a key fob, are disclosed. The keyless entry device has a charging battery, a rechargeable battery, at least one long range function button for a long range function, and at least one short range function button for a short range function. The method includes charging the rechargeable battery using the charging battery, wherein the rechargeable battery has a larger burst current delivery capacity than the charging battery. The method further includes sending a short range transmission from the keyless entry device using at least one of: the charging battery, and the rechargeable battery, when the at least one short range function button is actuated, sending a long range transmission from the keyless entry device at least one of: the charging battery, and the rechargeable battery, when the at least one long range function button is actuated.

20 Claims, 9 Drawing Sheets

Related U.S. Application Data

(60) Provisional application No. 62/026,599, filed on Jul. 18, 2014.

(51) Int. Cl.
  *G07C 9/00* (2020.01)
  *H02J 50/80* (2016.01)
  *B60R 25/24* (2013.01)
  *H02J 7/14* (2006.01)
  *H02J 7/34* (2006.01)

(52) U.S. Cl.
  CPC .............. *H02J 50/80* (2016.02); *B60R 25/24* (2013.01); *G07C 9/00182* (2013.01); *G07C 9/00309* (2013.01); *G07C 2009/00587* (2013.01); *G07C 2009/00769* (2013.01); *G07C 2009/00793* (2013.01); *H02J 7/1423* (2013.01); *H02J 7/342* (2020.01)

(58) Field of Classification Search
  USPC ......................................................... 320/103
  See application file for complete search history.

(56) References Cited

U.S. PATENT DOCUMENTS

| | | | |
|---|---|---|---|
| 3,798,527 A | 3/1974 | Du Plessix et al. | |
| 3,864,617 A * | 2/1975 | Smith | H02J 7/008 320/159 |
| 3,947,743 A | 3/1976 | Mabuchi et al. | |
| 3,987,352 A | 10/1976 | Hirota | |
| 4,056,764 A | 11/1977 | Endo et al. | |
| 4,186,335 A | 1/1980 | Cahill | |
| 4,510,431 A | 4/1985 | Winkler | |
| 4,761,824 A * | 8/1988 | Saito | H04B 1/44 340/663 |
| 5,407,444 A | 4/1995 | Kroll | |
| 5,523,670 A * | 6/1996 | Ninomiya | H02J 7/007184 320/161 |
| 5,568,038 A | 10/1996 | Tatsumi | |
| 5,606,240 A * | 2/1997 | Kokuga | H02J 7/0086 320/129 |
| 5,631,503 A * | 5/1997 | Cioffi | H02J 7/0013 307/43 |
| 5,644,210 A * | 7/1997 | Hwang | H02J 7/0071 320/148 |
| 5,663,629 A * | 9/1997 | Hinohara | H02J 7/0031 320/158 |
| 5,686,809 A | 11/1997 | Kimura et al. | |
| 5,686,813 A | 11/1997 | Huen et al. | |
| 5,717,308 A | 2/1998 | Nishitani et al. | |
| 5,760,701 A | 6/1998 | Mitsumoto | |
| 5,811,958 A | 9/1998 | Yamamoto | |
| 6,011,380 A | 1/2000 | Paryani et al. | |
| 6,452,362 B1 | 9/2002 | Choo | |
| 6,479,963 B1 | 11/2002 | Manor et al. | |
| 7,834,583 B2 | 11/2010 | Elder et al. | |
| 8,180,512 B2 | 5/2012 | Kelty et al. | |
| 8,381,849 B2 | 2/2013 | Sastry et al. | |
| 8,471,521 B2 | 6/2013 | Stewart et al. | |
| 8,543,270 B2 | 9/2013 | Kelty et al. | |
| 2005/0029867 A1 | 2/2005 | Wood | |
| 2005/0127871 A1 | 6/2005 | Orikasa | |
| 2006/0082346 A1* | 4/2006 | Nagasawa | H02J 7/0029 320/150 |
| 2006/0145811 A1* | 7/2006 | Nantz | G07C 9/00174 340/5.72 |
| 2007/0214296 A1 | 9/2007 | Takamatsu et al. | |
| 2008/0043676 A1 | 2/2008 | Mousseau et al. | |
| 2009/0115376 A1 | 5/2009 | Takeuchi | |
| 2009/0160607 A1* | 6/2009 | Edwards | B60R 25/24 340/5.61 |
| 2009/0243796 A1* | 10/2009 | Tieman | B60R 25/24 340/5.72 |
| 2010/0087961 A1 | 4/2010 | Velez | |
| 2010/0138175 A1* | 6/2010 | Yu | G01R 31/3835 702/63 |
| 2011/0102164 A1* | 5/2011 | Ghabra | B60R 25/04 340/426.13 |
| 2011/0115605 A1 | 5/2011 | Dimig et al. | |
| 2012/0197486 A1 | 8/2012 | Elliott | |
| 2014/0232322 A1* | 8/2014 | Kracker | B60R 16/00 320/103 |

* cited by examiner

KEYLESS ENTRY DEVICE AND METHOD FOR POWERING THE KEYLESS ENTRY DEVICE

RELATED APPLICATIONS

This application is a continuation of U.S. non-provisional application Ser. No. 14/745,744 filed on Jun. 22, 2015, which claims priority to U.S. Provisional Application Ser. No. 62/026,599 filed on Jul. 18, 2014, which are incorporated by reference herein.

BACKGROUND

Many vehicles utilize keyless entry devices. Presently, the industry standard for powering most keyless entry devices, such as a key fob, is to use a small battery cell, such as a lithium ion cell that is intended to sustain devices having a low electric current requirement (e.g., 10 mA). However, in some instances, the small battery cell cannot provide enough electric current for keyless entry devices that have higher electric current requirements (e.g., 80 mA), such as keyless entry devices that send high powered wireless long range transmissions.

BRIEF DESCRIPTION

According to one aspect, a method for powering a keyless entry device for a vehicle, includes providing the keyless entry device having a charging battery, a rechargeable battery, at least one long range function button for a long range function, and at least one short range function button for a short range function. The method includes charging the rechargeable battery using the charging battery, wherein the charging battery has a charging battery state of charge, the rechargeable battery has a larger burst current delivery capacity than the charging battery, and the rechargeable battery has a rechargeable battery state of charge. The method includes sending a short range transmission from the keyless entry device to the vehicle using at least one of: the charging battery, and the rechargeable battery, when the short range function is selected using the at least one short range function button. The method includes sending a long range transmission from the keyless entry device to the vehicle using at least one of: the charging battery, and the rechargeable battery, when the long range function is selected using the at least one long range function button.

According to another aspect, a non-transitory computer-readable storage medium storing executable code for powering a keyless entry device for a vehicle is provided. The code when executed, performs the actions including charging the rechargeable battery using the charging battery, and sending a short range transmission from the keyless entry device to the vehicle using at least one of: the charging battery, and the rechargeable battery of the keyless entry device, when a short range function of the keyless entry device is selected. The actions include sending a long range transmission from the keyless entry device to the vehicle using at least one of: the charging battery, and the rechargeable battery of the keyless entry device, when a long range function of the keyless entry device is selected. The charging battery has a charging battery state of charge, the rechargeable battery has a rechargeable battery state of charge, and the rechargeable battery has a larger burst current delivery capacity than the charging battery.

According to yet another aspect, a keyless entry device for a vehicle, includes a rechargeable battery having a rechargeable battery state of charge for sending at least one of: a short range transmission to the vehicle via the transceiver and a long range transmission to the vehicle via the transceiver, and a charging battery having a charging battery state of charge for sending at least one of: the short range transmission to the vehicle via the transceiver and the long range transmission to the vehicle via the transceiver, wherein the rechargeable battery has a larger burst current delivery capacity than the charging battery. The keyless entry device includes a battery charger for charging the rechargeable battery using the charging battery. The keyless entry device includes at least one short range function button that, when actuated, causes at least one of: the charging battery, and the rechargeable battery to send the short range transmission via the transceiver. The keyless entry device includes at least one long range function button that, when actuated, causes at least one of: the charging battery, and the rechargeable battery to send the long range transmission via the transceiver.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

Figure 1A:
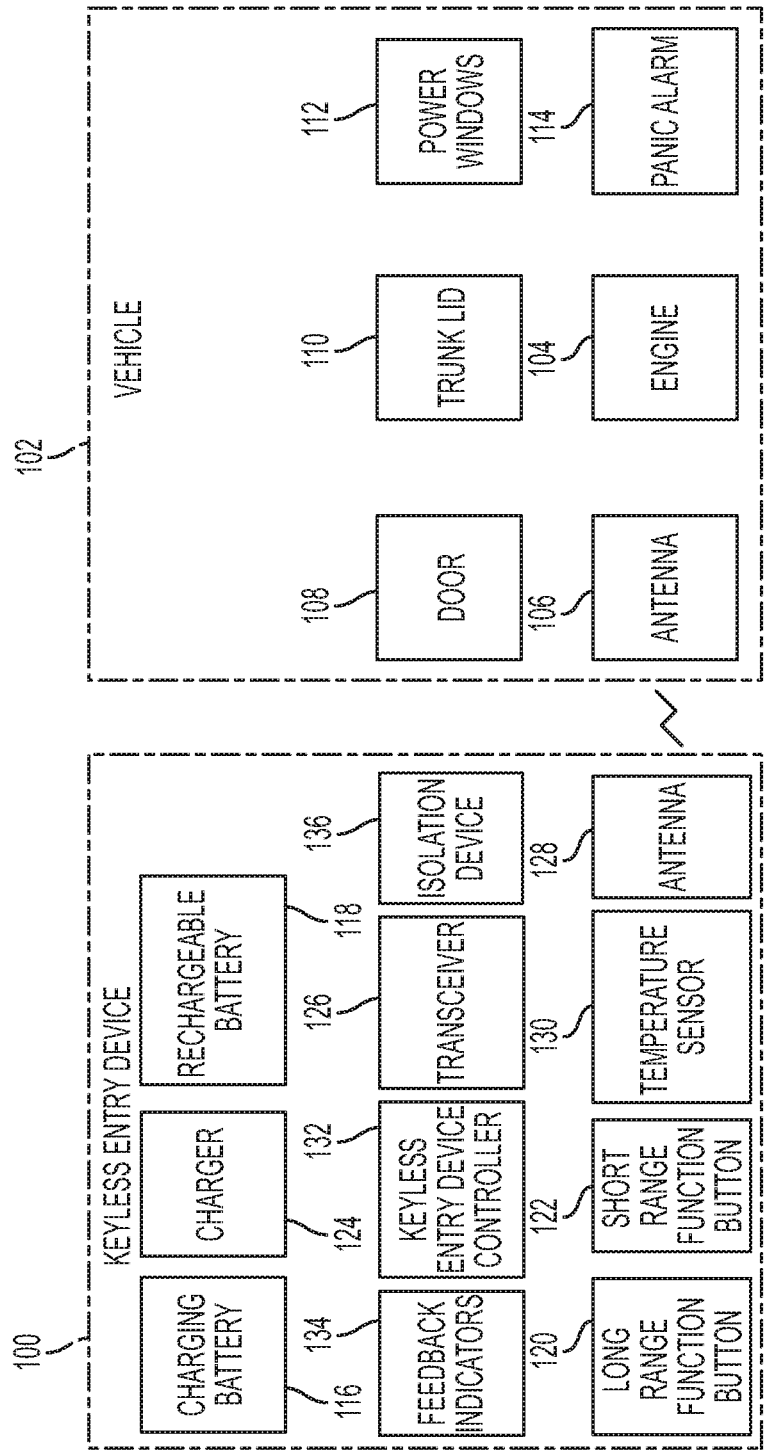
FIG. 1A is a block diagram of a keyless entry device and a vehicle with which the keyless entry device communicates in accordance with an exemplary embodiment of the present application.

1A-B is in storage in accordance with an exemplary embodiment of the present application.

DETAILED DESCRIPTION

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "database", as used herein can refer to table, a set of tables, and a set of data stores and/or methods for accessing and/or manipulating those data stores.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

I. Keyless Entry Device

Referring now to the drawings, wherein the showings are for purposes of illustrating one or more exemplary embodiment and not for purposes of limiting same, FIG. 1A illustrates a block diagram of a keyless entry device 100 and a vehicle 102 with which the keyless entry device 100 communicates in accordance with an exemplary embodiment of the present application.

The vehicle 102 can include an engine 104, an antenna 106, at least one door 108, a trunk lid 110, power windows 112, and a panic alarm 114. The antenna 106 of the vehicle 102 can be used to receive short range transmissions and long range transmissions from the keyless entry device 100 and send two-way feedback and smart commands to the keyless entry device 100. The door 108 of the vehicle 102 can be one or more doors that allow passengers to enter and exit the vehicle 102. In one exemplary embodiment, door 108 can be the driver's door of vehicle 102, and in other exemplary embodiments door 108 can be all of the doors of vehicle 102. The engine 104 provides motive power for the vehicle 102. The trunk lid 110 of the vehicle 102 covers a cargo area of the vehicle 102. In one exemplary embodiment, the trunk lid 110 can be a cover for a trunk of the vehicle 102, and in another exemplary embodiment, the trunk lid 110 can be a power or manual tail gate covering a cargo area located at a rear of the vehicle 102. Power windows 112 of the vehicle 102 can be one or more windows of the door 108, which open to provide ventilation for the passenger compartment of the vehicle 102. The panic alarm 114 of the vehicle 102 can attract attention to the vehicle 102. In one exemplary embodiment, panic alarm 114 attracts attention using the horn and/or headlights of the vehicle 102. The vehicle 102 can include components other than those illustrated in FIG. 1, and some components of the vehicle 102 are omitted from FIG. 1 for brevity purposes.

The keyless entry device 100 can include a dual battery system that includes a charging battery 116 and a rechargeable battery 118. The keyless entry device 100 can also include at least one long range function button 120 for a long range function, and at least one short range function button 122 for a short range function. The keyless entry device 100 also can include a charger 124, a transceiver 126, an antenna 128, a temperature sensor 130, and a keyless entry device controller 132. The charging battery 116 can provide electric current to charge the rechargeable battery 118. Further, the charging battery 116 can also provide electric current to the transceiver 126, such as when the transceiver 126 is transmitting short range functions from the keyless entry device 100 to the vehicle 102. The rechargeable battery 118 can provide electric current to the transceiver 126, such as when the transceiver 126 is transmitting long range functions from the keyless entry device 100 to the vehicle 102. The charger 124 can use electric current from the charging battery 116 to charge the rechargeable battery 118.

In an exemplary embodiment of the keyless entry device 100, short range functions, long range functions, smart commands, and two-way feedback can be wirelessly transmitted between the keyless entry device 100 and the vehicle 102 using the transceiver 126. The keyless entry device 100 can send and receive the wireless transmissions through the antenna 128. In one exemplary embodiment, the transceiver 126 can send short range functions and long range functions from the keyless entry device 100 to the vehicle 102. The long range function can be wirelessly transmitted to the vehicle 102 by the keyless entry device 100, when the at least one long range function button 120 is actuated, such as by pressing the at least one long range function button 120. The short range function can be wirelessly transmitted to the vehicle 102 by the keyless entry device 100, when the at least one short range function button 122 is actuated, such as by pressing. The transceiver 126 of the keyless entry device 100 can use the antenna 128 to receive smart commands and two-way feedback that are wirelessly transmitted from the vehicle 102.

The short range functions, long range functions, smart commands, and two-way feedback wirelessly transmitted between the keyless entry device 100 and the vehicle 102 can utilize radio frequency bands and communication protocols suitable for wireless transmission between the keyless entry device 100 and the vehicle 102. Such radio frequency bands can include, but are not limited to, low frequencies, high frequencies, and ultrahigh frequencies and the like. For example, radio frequency bands using 925 MHz (ISM band), 868 MHz, and 433 MHz can be utilized. Such wireless transmission protocols can include, but are not limited to, IEEE 802.11, IEEE 802.15, Bluetooth, and the like.

In an exemplary embodiment, the temperature sensor 130 provides a temperature measurement of the keyless entry device 100. The keyless entry device 100 will not charge the rechargeable battery 118, when the temperature measurement of the keyless entry device 100 provided by the temperature sensor 130 falls outside of a predetermined temperature range. Additionally, the keyless entry device 100 will not send short range transmissions and long range transmissions from the keyless entry device 100 to the vehicle 102 when the temperature of the keyless entry device 100 provided by the temperature sensor 130 falls outside of a predetermined temperature range.

Figure 1B:
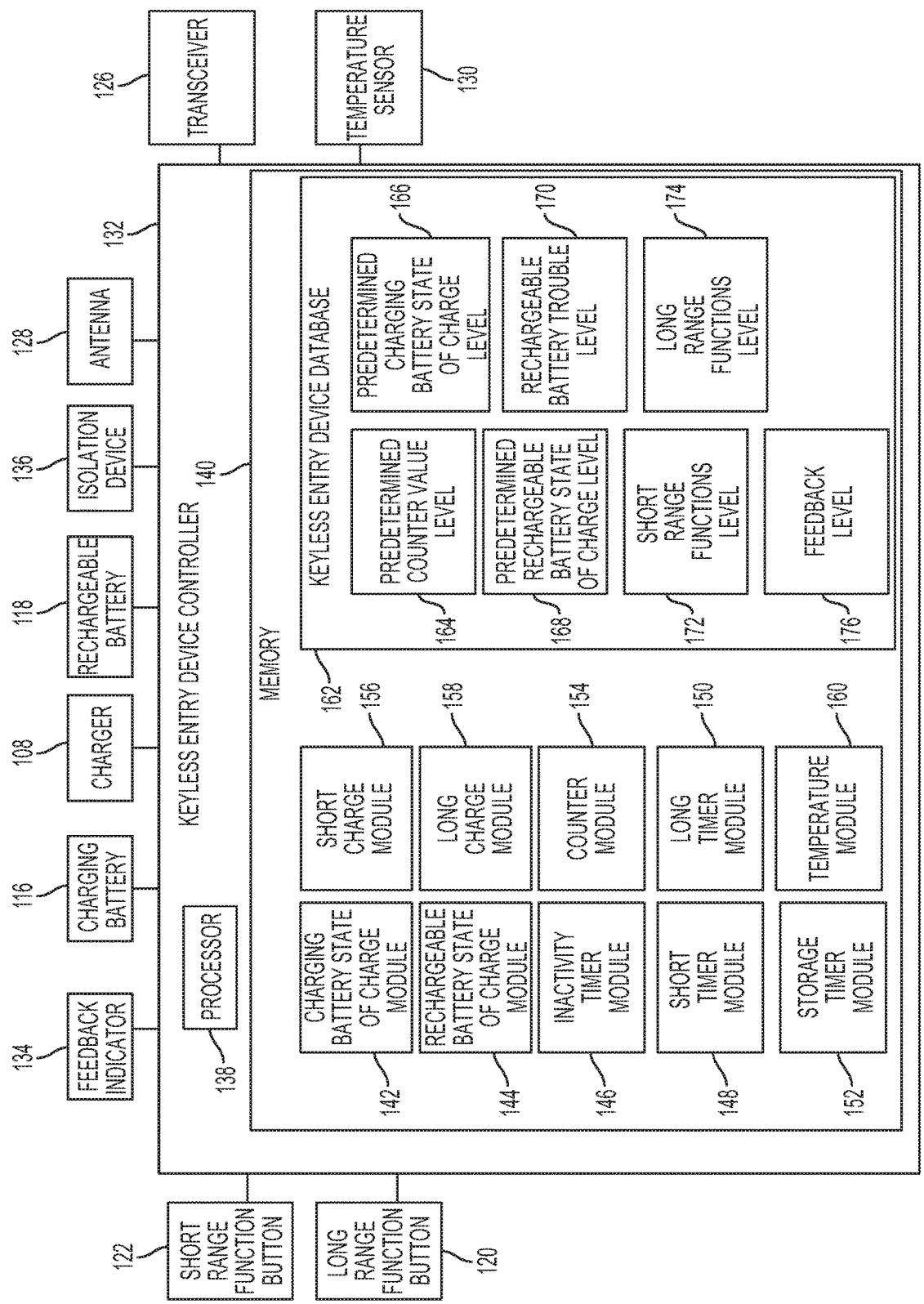
FIG. 1B is a detailed block diagram of a keyless entry device controller of the keyless entry device of FIG. 1A in accordance with an exemplary embodiment of the present application.

FIG. 1B illustrates a schematic view of the keyless entry device controller 132 of FIG. 1A in accordance with an exemplary embodiment of the present application, which will be described with reference to the elements of FIG. 1A. The keyless entry device controller 132 is connected to the charging battery 116, the rechargeable battery 118, the at least one long range function button 120, the at least one short range function button 122, the transceiver 126, the antenna 128, and the temperature sensor 130, the at least one feedback indicator 134, and the isolation device 136. The keyless entry device controller 132 includes a computer processor 138 and a memory 140. The keyless entry device controller 132 includes features, such as communication interfaces to the charging battery 116, the rechargeable battery 118, the at least one long range function button 120, the at least one short range function button 122, the transceiver 126, the antenna 128, the temperature sensor 130, the at least one feedback indicator 134, and the isolation device 136. However, illustration of these features has been omitted for brevity purposes. In other exemplary embodiments, the keyless entry device controller 132 may also include additional features other than those illustrated in FIGS. 1A-B.

In one exemplary embodiment, the processor 138 processes data signals and can comprise various computing architectures including, but not limited to, a complex instruction set computer (CISC) architecture, a reduced instruction set computer (RISC) architecture, or an architecture implementing a combination of instruction sets. Although only a single processor is shown in FIG. 1B, multiple processors can be included. The processor 138 can comprise an arithmetic logic device, a microprocessor, or some other information appliance equipped to transmit, receive, and process non-transitory electronic data signals from the memory 140, the charging battery 116, the rechargeable battery 118, the at least one long range function button 120, the at least one short range function button 122, the transceiver 126, the antenna 128, the temperature sensor 130, the at least one feedback indicator 134, and the isolation device 136.

In one exemplary embodiment, the memory 140 stores instructions and/or data that can be executed by the processor 138. The instructions and/or data can comprise code (e.g. modules and/or databases) for performing all of the techniques described herein. In one exemplary embodiment, the memory 140 includes a charging battery state of charge module 142, a rechargeable battery state of charge module 144, an inactivity timer module 146, a short timer module 148, a long timer module 150, a storage timer module 152, a counter module 154, a short charge module 156, a long charge module 158, a temperature module 160, and a keyless entry device database 162. The keyless entry device database 162 can include a predetermined counter value level 164, a predetermined charging battery state of charge level 166, a predetermined rechargeable battery state of charge level 168, a rechargeable battery trouble level 170, a short range functions level 172, a long range functions level 174, and a feedback level 176.

In other exemplary embodiments, other modules and databases than those shown in FIG. 1B can be used to perform the functionality described herein. For example, one or more of the predetermined counter value level 164, the predetermined charging battery state of charge level 166, the predetermined rechargeable battery state of charge level 168, the rechargeable battery trouble level 170, the short range functions level 172, the long range functions level 174, and the feedback level 176 can be included in a database other than the keyless entry device database 162 of the keyless entry device controller 132. In one exemplary embodiment, the keyless entry device database 162 can be hosted locally, such as in the memory 140 of the keyless entry device controller 132. In other exemplary embodiments, the keyless entry device database 162 can be hosted remotely from the keyless entry device 100 and/or tied to another application. The modules and databases of the keyless entry device 100 are adapted to communicate, via a bus (not shown), with the processor 138, the charging battery 116, the rechargeable battery 118, the at least one long range function button 120, the at least one short range function button 122, the at least one, the transceiver 126, the antenna 128, the temperature sensor 130, the feedback indicator 134, and the isolation device 136.

The charging battery 116 has a charging battery state of charge. The rechargeable battery 118 also has a rechargeable battery state of charge and includes a larger burst electric current delivery capacity than the charging battery 116. In one exemplary embodiment, the rechargeable battery 118 is in a form of a rechargeable cell that can produce the 'burst current' necessary to supply the required power to the transceiver 126 to support wireless long range transmissions (e.g., long-range RF transmission). In an exemplary battery, the rechargeable battery 118 can specifically include a Lithium Iron Phosphate (LiFePO4) type battery. The LiFePO4 battery provides a safe technology and an ideal voltage to work with existing keyless entry device integrated circuit components. In alternate embodiments, the rechargeable battery 118 can include other types of batteries that are capable of being recharged and can produce the burst current necessary for supplying the required power to support high powered wireless long range transmissions through the antenna 128. In one exemplary embodiment, the burst current of the rechargeable battery is about 80 mA.

The rechargeable battery state of charge can be determined using the rechargeable battery state of charge module 144. In one exemplary embodiment, the rechargeable battery state of charge module 144 can measure the voltage of the rechargeable battery 118 and determine the rechargeable battery state of charge based on a comparison of a rechargeable voltage measurement value within a look-up table. In one exemplary embodiment, the rechargeable battery state of charge module 144 can determine the rechargeable battery state of charge by first performing an analog measurement of the voltage of the rechargeable battery 118 using a rechargeable battery voltage measurement line 208. The rechargeable battery state of charge module 144 then performs an analog to digital conversion of the rechargeable battery voltage analog measurement acquired using the rechargeable battery voltage measurement line 208. Lastly, the rechargeable battery state of charge module 144 compares the converted rechargeable battery voltage with the rechargeable voltage measurement value within the look-up table to determine the rechargeable battery state of charge. The rechargeable battery voltage measurement line 208 is further discussed with regards to FIG. 2.

Further, in one exemplary embodiment, the charging battery 116 is in the form of a CR2032 coin cell battery that can produce an electric current sufficient to provide the charger 124 with power to recharge the rechargeable battery 118. The charging battery 116 can also produce a "burst current" sufficient to provide the transceiver 126 with sufficient power to support wireless short range transmissions through the antenna 128. In one exemplary embodiment, the burst current of the charging battery 116 can be about 10 mA.

The charging battery state of charge can be determined using the charging battery state of charge module 142. In one exemplary embodiment, the charging battery state of charge module 142 can measure the voltage of the charging battery 116 and determine the charging battery state of charge based on a comparison of a charging voltage measurement value within a look-up table. In one exemplary embodiment, the charging battery state of charge module 142 can determine the charging battery state of charge by first performing an analog measurement of the voltage of the charging battery 116 using a charging battery voltage measurement line 206. The charging battery state of charge module 142 then performs an analog to digital conversion of the charging battery voltage analog measurement acquired using the charging battery voltage measurement line 206. Lastly, the charging battery state of charge module 142 compares the converted charging battery voltage and with the charging voltage measurement value within the look-up table to determine the charging battery state of charge. The charging battery voltage measurement line 206 is further discussed in FIG. 2.

In one exemplary embodiment, the charger 124 includes battery charging circuitry that uses electric current supplied from the charging battery 116 to charge rechargeable battery 118. In one exemplary embodiment, the charger 124 can be a switching charger circuit that boosts the lower voltage of the charging battery 116 up to a higher voltage sufficient to charge the rechargeable battery 118. The long charge module 158 can use the charger 124 and charging battery 116 to charge the rechargeable battery 118 in accordance with a long charge 400, as is discussed below in FIG. 4. Further, the short charge module 156 can use the charger 124 and charging battery 116 to charge the rechargeable battery 118 in accordance with a short charge 300, as is discussed below in FIG. 3.

The transceiver 126 sends short range transmissions and long range transmissions to the vehicle 102 through the antenna 128. In one exemplary embodiment, the transceiver 126 can be an application specific integrated circuit. Electric current is provided to the transceiver 126 from the charging battery 116, when a short range transmission is being sent by the keyless entry device 100 to the vehicle 102. The lower burst current delivered to transceiver 126 from the charging battery 116 and/or the rechargeable battery 118 is sufficient to power the transceiver 126, when sending a short range transmission to the vehicle 102. Electric current is provided to the transceiver 126 from the rechargeable battery 118, when a long range transmission is being sent by the keyless entry device 100 to the vehicle 102. Electric current is provided by the rechargeable battery 118 to the transceiver 126 via the isolation device 136. The higher burst current delivered to transceiver 126 from charging battery 116 and/or the rechargeable battery 118 is sufficient to power the transceiver 126, when sending a long range transmission to the vehicle 102.

Isolation device 136 is selectively activated by the keyless entry device controller 132 to provide electric current to transceiver 126 from the rechargeable battery 118, when keyless entry device is sending a wireless long range transmission to the vehicle 102. Isolation device 136 does not provide electric current to transceiver 126 from the rechargeable battery 118 when the isolation device 136 is not activated by the keyless entry device controller 132. In one exemplary embodiment, the isolation device 136 can be a field effect transistor; however, isolation device 136 can be any device that is capable of providing the function of delivering electric current from the rechargeable battery 118 to the transceiver 126, when selectively activated by the keyless entry device controller 132.

Further, short range transmissions are sent from the keyless entry device 100 to the vehicle 102 using the charging battery 116 and/or the rechargeable battery 118, when the short range function is selected using the at least one short range function button 122. For example, the keyless entry device 100 sends a short range transmission to the vehicle 102 by providing electric current to the transceiver 126 from the charging battery 116 and/or the rechargeable battery 118. The transceiver 126 sends the short range transmission signal to the vehicle 102 through the antenna 128. In one exemplary embodiment, the short range function is selected using the at least one short range function button 122, when the at least one short range function button 122 is actuated via pressing, which is registered as an input by the keyless entry device controller 132. In one exemplary embodiment, the at least one short range function button 122 can include at least one of an unlock button (not shown), panic button (not shown), and trunk/power tail gate button (not shown). Further, in one exemplary embodiment, the short range function can include one or more of unlocking all of the doors 108 of the vehicle 102, unlocking only the driver door 108 of the vehicle 102, rolling down the power windows 112 of the vehicle 102, opening the trunk lid 110 of the vehicle 102, and/or activating a panic alarm 114 of the vehicle 102.

In one exemplary embodiment, the keyless entry device 100 sends the vehicle 102 a short range transmission of the unlock all of the doors short range function, when the unlock button of the at least one short range function button 122 is actuated twice. The keyless entry device 100 sends the vehicle 102 a short range transmission of the unlock the driver door short range function, when the unlock button is actuated once. The keyless entry device 100 sends the vehicle 102 a short range transmission of the roll down the power windows short range function, when the unlock button is actuated twice and held down on the second actuation. The keyless entry device 100 sends the vehicle 102 a short range transmission of the open the trunk lid short range function, when the trunk/power tail gate button is actuated and held. The keyless entry device 100 sends the vehicle 102 a short range transmission of the panic short range function that activates the panic alarm 114 of the vehicle 102, when the panic button is actuated and held. The short range functions and corresponding buttons or button combinations of the at least one short range function button 122 are stored in the short range functions level 172 of the keyless entry device database 162.

Additionally, long range transmissions are sent from the keyless entry device 100 to the vehicle 102 using the charging battery 116 and/or the rechargeable battery 118, when the long range function is selected using the at least one long range function button 120. In one exemplary embodiment, the long range function is selected using the at least one long range function button 120, when the at least one long range function button 120 is actuated via pressing, which is registered as an input by the keyless entry device controller 132. In one exemplary embodiment, the at least one long range function button 120 can include at least one of an engine button (not shown) and a lock button (not shown). Further, in one exemplary embodiment, long range function can include at least one of starting an engine 104 of the vehicle 102, stopping the engine 104 of the vehicle 102, and/or requesting the status of the engine 104 of the vehicle 102. The long range functions and corresponding buttons or button combinations of the at least one long range function button 120 are stored in the long range functions level 174 of the keyless entry device database 162.

In one exemplary embodiment, the keyless entry device 100 sends the vehicle 102 a long range transmission of the start the engine long range function, when the lock button is actuated followed by the engine button being actuated and held. The keyless entry device 100 sends the vehicle 102 a long range transmission of the stop the engine long range function, when the engine button is actuated and held. The keyless entry device 100 sends the vehicle 102 a long range transmission requesting the status of the engine 104, when the lock button is actuated followed by the holding of the engine button.

Further, two-way feedback can be established between the keyless entry device 100 and the vehicle 102. The feedback received by keyless entry device 100 from vehicle 102 is indicated on keyless entry device 100 by one or more feedback indicators 134. In one exemplary embodiment, the feedback indicators 134 can include three LEDs. Other exemplary embodiments can include different feedback indicators 134 that are capable of providing indications to the user regarding the status of communication between the keyless entry device 100, the vehicle 102, and the various long range functions. The three LEDs can include a first LED, a second LED, and a third LED. In one exemplary embodiment, the first LED can be amber, the second LED can be green, and the third LED can be red. The two-way feedback can indicate one or more of: the keyless entry device 100 is communicating with the vehicle 102, the keyless entry device 100 is awaiting the status of the engine 104 from the engine control unit of the vehicle 102 (e.g. engine 104 running or engine 104 not running), the engine 104 of vehicle 102 is running, the engine 104 of the vehicle 102 is not running, the doors 108 of the vehicle 102 are locked, the doors 108 of the vehicle 102 are unable to be locked, the keyless entry device 100 cannot communicate with the vehicle 102, and/or the keyless entry device 100 is out of range of the vehicle 102. The types of feedback for the various long range functions of the keyless entry device 100 and the corresponding patterns of the feedback indicators 134 can be stored in the feedback level 176 of the keyless entry device database 162.

In one exemplary embodiment, the first LED flashing once upon the actuating of an at least one long range function button 120, can indicate that the keyless entry device 100 is sending a long range transmission to the vehicle 102. The first LED flashing three times at a rate of one flash per second, can indicate that the keyless entry device 100 is waiting to receive the status of the engine 104 from the vehicle 102. The first LED flashing three times at a rate of one flash per second followed by a second LED illuminated for one second, can indicate that the engine 104 is running or the doors 108 of vehicle 102 are locked. The first LED flashing three times at a rate of one flash per second followed by the third LED flashing for one second, can indicate that the engine 104 is not running or the doors 108 of the vehicle 102 are unable to be unlocked. The third LED flashing three times at a rate of one flash per second, can indicate that the keyless entry device 100 is out of the range of vehicle 102 or otherwise cannot communicate with vehicle 102. In one exemplary embodiment, the feedback for the various long range functions of the keyless entry device 100 and the corresponding patterns of the first LED, second LED, and third LED can be stored in the feedback level 176 of the keyless entry device database 162.

The keyless entry device controller 132 of the keyless entry device 100 sends a short range communication of a short range function or a long range communication of a long range function to the vehicle 102, based on an input received from a user through the at least one long range function button 120 or the at least one short range function button 122. The long range function is transmitted via a long range transmission by the transceiver 126 through the antenna 128 to the vehicle 102. The long range transmission by the transceiver 126 is powered by the rechargeable battery 118. More specifically, the keyless entry device controller 132 activates the isolation device 136 to deliver sufficient burst current from the rechargeable battery 118 to the transceiver 126, when the transceiver is making a long range transmission to the vehicle 102.

The temperature sensor 130 provides measurements of the temperature of the keyless entry device 100 to the keyless entry device controller 132. The keyless entry device controller 132 will not permit the rechargeable battery 118 to be charged, when the temperature of the keyless entry device 100 provided by the temperature sensor 130 falls outside of a predetermined temperature range. Additionally, the keyless entry device 100 will not send short range transmissions and long range transmissions from the keyless entry device 100 to the vehicle 102 when the temperature of the keyless entry device 100 provided by the temperature sensor 130 falls outside of a predetermined temperature range. The temperature sensor 130 can be a thermistor or another type of thermal device that is capable of providing a temperature measurement of the keyless entry device 100 to the keyless entry device controller. In one exemplary embodiment, the temperature sensor 130 provides an analog voltage representative of the temperature of the keyless entry device 100 to the temperature module 160 of the keyless entry device controller 132, which converts the analog voltage to the corresponding temperature of the keyless entry device 100. In some exemplary embodiments, the temperature module 160 of the keyless entry device controller 132 can use a lookup-table or an equation to convert the analog voltage to the corresponding temperature of the keyless entry device 100.

The antenna 128 of the keyless entry device 100 can have multiple poles, to maximize the magnetic field passing through the keyless entry device 100 regardless of the orientation of the keyless entry device 100. The antenna 128 of the keyless entry device 100 can have one or more antennas 128. Each axis of each antenna 128 is independently powered by the charging battery 116 and has an individual input to the keyless entry device controller 132. The antenna(s) 128 can "listen" for smart commands, from the vehicle 102, such as low frequency smart commands. The antenna(s) 128 can additionally transmit short range or long range radio frequency commands. In one exemplary embodiment, the antenna(s) 128 is constantly "listening" for smart commands, which can lead to a decrease in the life of the charging battery 116 that supplies the antenna(s) 128 with power. Accordingly, in an effort to extend the life of the charging battery 116, one or more poles of the antenna(s) 128 can be de-energized, such as when the keyless entry device 100 is in storage. In one exemplary embodiment, the keyless entry device controller 132 de-energizes one pole of the antenna(s) 128, when a storage timer of the storage timer module 152 expires.

The keyless entry device controller 132 can re-energize the de-energized pole of the antenna(s) 128, such as when the at least one short range function button 122 is actuated, the at least one long range function button 120 is actuated, and/or the antenna(s) 128 receives a smart command from the vehicle 102. Further, the storage timer module 152 can reset the storage timer of the storage timer module 152, such as when the at least one long range function button 120 is actuated, and/or the antenna(s) 128 receives the smart command from the vehicle 102. In one exemplary embodiment, the smart commands can include a long charge start command sent to the keyless entry device 100 from the vehicle 102 to start a long charge 400 of the rechargeable battery 118, and a long charge stop command sent to the keyless entry device 100 from the vehicle 102 to stop the long charge 400 of the rechargeable battery 118. In one exemplary embodiment, the length of the storage timer of the storage timer module 152 can be set to one month. In other exemplary embodiments, the length of the storage timer of the storage timer module 152 can be set to a different length of time that allows for the maximization of the life of the charging battery 116, such as when the keyless entry device 100 is in storage, while having a relatively small impact on the overall operation of the keyless entry device.

The keyless entry device 100 can include components other than those illustrated in FIGS. 1A-B, and some components of the keyless entry device 100, such as the casing, are omitted from FIGS. 1A-B for brevity purposes.

II. Charging Circuitry Schematic of the Keyless Entry Device

Figure 2:
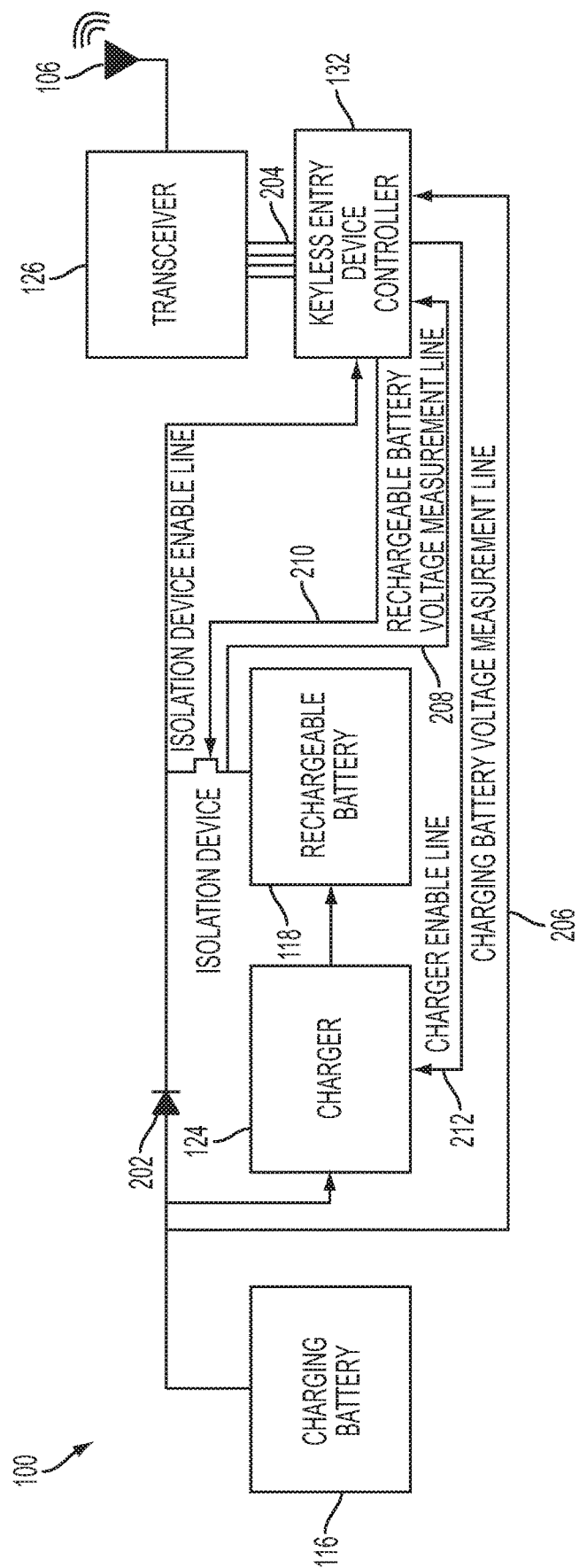
FIG. 2 is a schematic view of the circuitry of the keyless entry device of FIG. 1A-B in accordance with an exemplary embodiment of the present application.

FIG. 2 is a schematic view of the circuitry of the keyless entry device 100 of FIG. 1A-B in accordance with an exemplary embodiment of the present application, which will be described with reference to FIGS. 1A-B. It is noted that for the purposes of brevity and clarity, not all of the components of the keyless entry device 100 are shown in FIG. 2, such as the temperature sensor 130, keyless entry device database 162, etc.

In addition to the components discussed above, the keyless entry device 100 includes a diode 202, transmission lines 204, a charging battery voltage measurement line 206, a rechargeable battery voltage measurement line 208, an isolation device enable line 210, and a charger enable line 212. The diode 202 can prevent electric current from flowing back upstream from the rechargeable battery 118 to the charging battery 116, such as when the rechargeable battery is providing electric current to the transceiver 126 at a higher operating voltage than the operating voltage of the charging battery 116. The isolation device 136 can deliver current from the rechargeable battery 118 to the transceiver 126. The rechargeable battery voltage measurement line 208 can allow the rechargeable battery state of charge module 144 of the keyless entry device controller 132 to obtain a measurement of the voltage of the rechargeable battery 118. The charging battery voltage measurement line 206 can allow the charging battery state of charge module 142 of the keyless entry device controller 132 to obtain a measurement of the voltage of the charging battery 116.

The isolation device 136 delivers electric current from the rechargeable battery 118 to the transceiver 126, when the isolation device 136 is enabled. The isolation device 136 can be enabled by the keyless entry device controller 132 via the isolation device enable line 210. Further, in some exemplary embodiments, the electric current from the rechargeable battery 118 can pass through the keyless entry device controller 132 while en route to the transceiver 126. As was stated above, the isolation device 136 can be enabled, thus permitting the rechargeable battery 118 to provide electric current to the transceiver 126, when the transceiver 126 is performing a high power activity, such as sending a long range transmission to the vehicle 102.

As was stated above, the isolation device 136 is not enabled when the transceiver is performing a low power activity, such as sending a short range transmission to the vehicle 102. Transmission lines 204 can pass control signals to the transceiver 126. Further, transmission lines 204 can also carry short range functions and long range functions to the transceiver 126 for transmission to the vehicle 102 as short range transmissions and long range transmissions. Additionally, transmission lines 204 can also carry two-way feedback from the vehicle 102 through antenna(s) 106 to the keyless entry device controller 132 of the keyless entry device 100.

The charging battery state of charge module 142 of the keyless entry device controller 132 can obtain a measurement of the voltage of the charging battery 116 through the charging battery voltage measurement line 206. In one exemplary embodiment, the charging battery voltage measurement line 206 can permit the charging battery state of charge module 142 to obtain an open circuit voltage measurement of the charging battery 116 and calculate a state of charge for the charging battery 116. As was stated above, in one exemplary embodiment, the charging battery state of charge module 142 can measure the voltage of the charging battery 116 and calculate a state of charge, based on the measured voltage of the charging battery 116.

In one exemplary embodiment, the charging battery state of charge module 142 can determine the charging battery state of charge by first performing an analog measurement of the voltage of the charging battery 116 using a charging battery voltage measurement line 206. Next, the charging battery state of charge module 142 performs an analog to digital conversion of the analog measurement of the voltage of the charging battery 116 acquired using the charging battery voltage measurement line 206. Then, the charging battery state of charge module compares the measured voltage of the charging battery 116 with the charging voltage measurement value within the look-up table (discussed above) to determine the charging battery state of charge.

The rechargeable battery state of charge module 144 of the keyless entry device controller 132 can obtain a measurement of the voltage of the rechargeable battery 118 through the rechargeable battery voltage measurement line 208. As was stated above, in one exemplary embodiment, the rechargeable battery voltage measurement line 208 can permit the rechargeable battery state of charge module 144 to obtain an open circuit voltage measurement of the rechargeable battery 118 and determine a state of charge for the rechargeable battery 118.

In one exemplary embodiment, the rechargeable battery state of charge module 144 can determine the rechargeable battery state of charge by first performing an analog measurement of the voltage of the rechargeable battery 118 using the rechargeable battery voltage measurement line 208. Next, the rechargeable battery state of charge module 144 performs an analog to digital conversion of the analog measurement of the rechargeable battery 118 acquired using the rechargeable battery voltage measurement line 208. Then, the rechargeable battery state of charge module 144 compares the measured voltage of the rechargeable battery 118 with the rechargeable voltage measurement value within the look-up table (discussed above) to determine the rechargeable battery state of charge.

The short charge module 156 and the long charge module 158 of the keyless entry device controller 132 can charge the rechargeable battery 118 by activating the charger 124 via the charger enable line 212. When the charger 124 is activated, the charger 124 can use electric current provided by the charging battery 116 to charge the rechargeable battery 118.

III. Short Charge Method of the Keyless Entry Device

Figure 3:
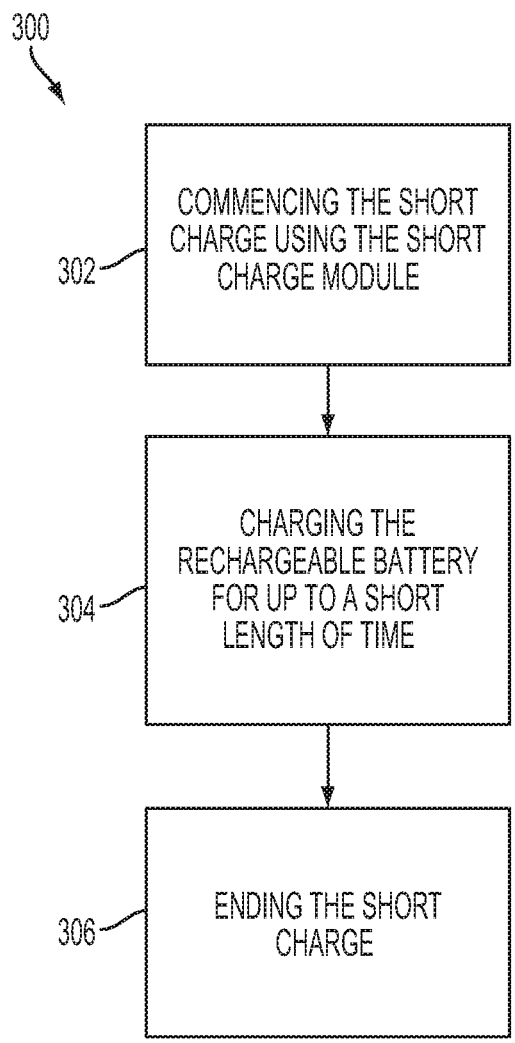
FIG. 3 is a process flow diagram of a short charge of the keyless entry device of FIGS. 1A-B in accordance with an exemplary embodiment of the present application.

FIG. 3 is a process flow diagram of a short charge 300 of the keyless entry device 100 of FIGS. 1A-B in accordance with an exemplary embodiment of the present application, which will be described with reference to FIGS. 1A-B. However, the method of FIG. 3 can also be used with other systems and embodiments besides those of FIGS. 1A-B, such as other portable electronic devices which periodically require large bursts of electric current.

In block 302, the short charge method 300 includes commencing the short charge 300 of the rechargeable battery 118 using the short charge module 156. The short charge module 156 can commence the short charge 300 of the rechargeable battery in order to replace the energy lost due to the long range transmission which can be represented by the rechargeable battery state of charge falling below a second predetermined state of charge threshold and the temperature of the keyless entry device 100 falling below a predetermined temperature range. In one exemplary embodiment of the keyless entry device, the second predetermined state of charge threshold can be 20% and the predetermined temperature range can be greater than or equal to 10° C. and less than 40° C. In other exemplary embodiments, the predetermined temperature range and the second predetermined state of charge threshold can have different values.

In block 304, the short charge method 300 includes charging the rechargeable battery 118 for up to a short length of time. In one exemplary embodiment, the short charge module 156 performs a short charge 300, which is the charge of the rechargeable battery 118 for up to a short length of time, using the charger 124 and the charging battery 116. The short length of time is tracked by the short charge timer of the short charge module 156. The short length of time is variable and is determined by the value of the counter of the counter module 154. More specifically, the short length of time can be set equal to a first predetermined short charge time, such as when the value of the counter is greater than or equal to a first predetermined counter value and less than or equal to a second predetermined counter value. Further, the short length of time can be set equal to a second predetermined short charge time, such as when the value of the counter is greater than or equal to a third predetermined counter value and less than or equal to a fourth predetermined counter value. Additionally, the short length of time can be set equal to a third predetermined short charge time, such as when the value of the counter is greater than or equal to a fifth predetermined counter value and less than or equal to a sixth predetermined counter value. Also, the short length of time can be set equal to a fourth predetermined short charge time, such as when the value of the counter is greater than a seventh predetermined counter value and less than or equal to an eighth predetermined counter value. Further, the short length of time can be set equal to a fifth predetermined short charge time, such as when the value of the counter is greater than a ninth predetermined counter value and less than or equal to a tenth predetermined counter value.

In one exemplary embodiment, the first predetermined short charge time can be 0 seconds, the first predetermined counter value can be 0 (during little to no usage of the keyless entry device 100), and the second predetermined counter value can be 15 (during low to average usage of the keyless entry device 100). Further, the second predetermined short charge time can be 5 seconds, the third predetermined counter value can be 16 (during average usage of the keyless entry device 100), and the fourth predetermined counter value can be 31 (during high usage of the keyless entry device 100). Also, the third predetermined short charge time can be 10 seconds, the fifth predetermined counter value can be 32, and the sixth predetermined counter value can be 47. Additionally, the fourth predetermined short charge time can be 15 seconds, the seventh predetermined counter value can be 48, and the eighth predetermined counter value can be 63. Further, the fifth predetermined short charge time can be 20 seconds, the ninth predetermined counter value can be 64, and the tenth predetermined counter value can be 79.

As represented above, the predetermined counter value can increase as the keyless entry device 100 is heavily used since the higher the use of the keyless entry device 100 results in a lower battery state of charge. Therefore, the higher the predetermined counter value will be will correspond with a higher predetermined short charge time. Accordingly, as represented above, if the usage of the keyless entry device 100 decreases, the predetermined counter value and the predetermined short charge time will also decrease.

The above discussed predetermined short charge times and predetermined counter values were selected to balance the need of charging the rechargeable battery 118, while minimizing the constant electric current draw on the charging battery 116. Other exemplary embodiments of the keyless entry device 100 can use more or less predetermined charge times and predetermined counter values. Further, other values for the short charge times and predetermined counter values can be used in other exemplary embodiments of the keyless entry device 100 to balance the need of charging the rechargeable battery 118, while minimizing the constant electric current draw on the charging battery 116. Accordingly, in one exemplary embodiment, the short charge time of the short charge module 156 can be 5 or 10 seconds, such as when the keyless entry device 100 undergoes typical use; the short charge time of the short charge module 156 can be 20 seconds, such as when the keyless entry device 100 undergoes heavy use; and the short charge time of the short charge module 156 can be about 0-5 seconds, such as when the keyless entry device 100 is in storage. The predetermined counter values can be stored in the predetermined counter value level 164 of the keyless entry device database 162.

The value of the counter of the counter module 154 can be decreased or increased by the counter module 154 based on the rechargeable battery state of charge. In one exemplary embodiment, the counter module 154 decreases the value of the counter, when the rechargeable battery state of charge is greater than a first predetermined state of charge threshold. The counter module 154 increases the value of the counter, when the rechargeable battery state of charge is less than a second predetermined state of charge threshold.

The first and second predetermined state of charge thresholds balance the need of charging the rechargeable battery 118, while minimizing the constant electric current draw on the charging battery 116. This balance is maintained by keeping track of the rechargeable battery state of charge using the value of the counter of the counter module 154, and providing the rechargeable battery 118 with a periodic charge that is sufficient to maintain an ideal state of charge (e.g. 50%) through periodic short charges using the short charge module 156. The short charges having a duration that is based on the value of the counter. In one exemplary embodiment, the first predetermined state of charge threshold can be 70%, and the second predetermined state of charge threshold can be 30%. However, other values for the first predetermined state of charge threshold and second predetermined state of charge threshold can be used in other exemplary embodiments of keyless entry device 100 to balance the need of charging the rechargeable battery 118, while minimizing the constant electric current draw on the charging battery 116.

In one exemplary embodiment, the counter module 154 utilizes a measurement taken by the rechargeable battery state of charge module 144 to determine the rechargeable battery state of charge, when the short timer of the short timer module 148 expires. In one exemplary embodiment, the short timer of the short timer module 148 can be set at as short as possible to get an accurate measurement of the rechargeable battery state of charge. The short timer starting value of the short timer module 148 is set to ensure that the rechargeable battery state of charge is determined at intervals sufficient to maintain a 50% state of charge in the rechargeable battery 118. Therefore, the short timer of the short timer module 148 can be set to a different starting value in other exemplary embodiments of the keyless entry device 100 to ensure that the rechargeable battery state of charge is determined at intervals sufficient to maintain a 50% state of charge in the rechargeable battery 118.

The short timer of the short timer module 148 is not automatically reset and started by the short timer module 148 when the short timer expires. In one exemplary embodiment, the short timer module 148 can reset and restart the short timer, such as when the short charge module 156 stops a short charge 300 of the rechargeable battery 118, the short charge module 156 sets a trouble flag of the rechargeable battery trouble level 170, and/or the long charge module 158 stops a long charge 400 of the rechargeable battery 118. Further, the short timer module 148 can reset and restart the short timer, such as when the long charge module 158 sets a trouble flag of the rechargeable battery trouble level 170, the temperature of the keyless entry device 100 is outside of the predetermined temperature range, and/or the rechargeable battery state of charge is below the fourth predetermined state of charge threshold.

In block 306, the short charge method 300 includes ending the short charge 300. In one exemplary embodiment, the short charge module 156 ends the short charge 300, when at least one short charge exit condition is met. In one exemplary embodiment, the short charge exit conditions can include the short length of time elapsing, any button on the keyless entry device 100 being actuated, a smart trigger being detected by the keyless entry device 100, a stop charge command being received by the keyless entry device 100 from the vehicle 102, the rechargeable battery state of charge exceeding a predetermined third state of charge threshold, and/or the charging battery state of charge being below the predetermined charging battery low threshold. In one exemplary embodiment, the short length of time elapses, when the short charge timer of the short charge module 156 expires. Further, in one exemplary embodiment, any button of the keyless entry device 100 is actuated, when any of the at least one long range function button 120 or the at least one short range function button 122 is actuated.

IV. Long Charge Method of the Keyless Entry Device

Figure 4:
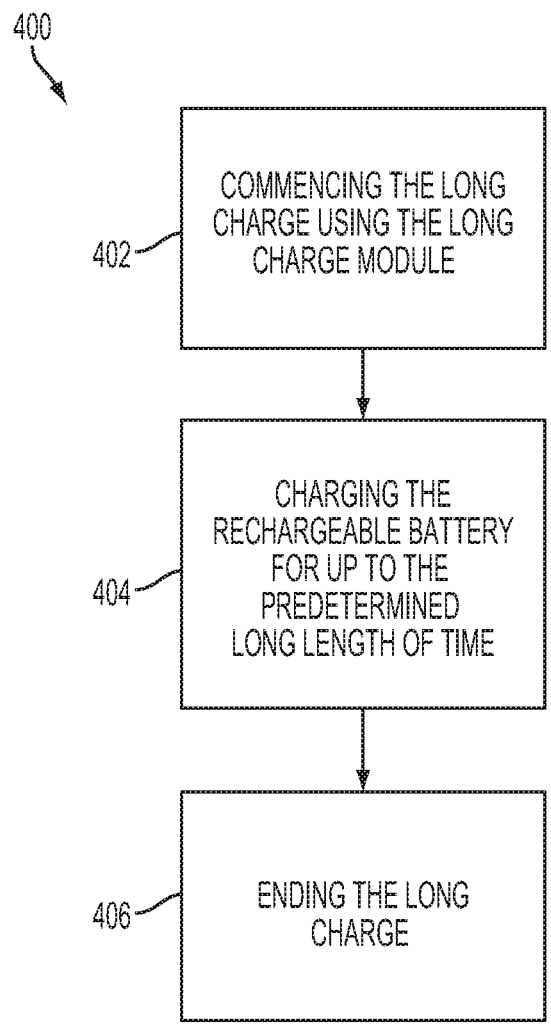
FIG. 4 is a process flow diagram of a long charge of the keyless entry device of FIGS. 1A-B in accordance with an exemplary embodiment of the present application.

FIG. 4 is a process flow diagram of a long charge 400 of the keyless entry device 100 of FIGS. 1A-B in accordance with an exemplary embodiment of the present application, which will be described with reference to FIGS. 1A-B. However, the method of FIG. 4 can also be used with other systems and exemplary embodiments besides those of FIGS. 1A-B, such as other portable electronic devices which periodically require large bursts of electric current.

In block 402, the long charge method 400 includes commencing the long charge 400 of the rechargeable battery 118 using the long charge module 158. The long charge module 158 can commence a long charge 400 of the rechargeable battery 118 for up to a long predetermined length of time. In one exemplary embodiment, the long charge module can commence a long charge 400 when at least one of: the long charge start command is received by the keyless entry device 100 from the vehicle 102; a long timer of the long timer module 150 expires; and/or the rechargeable battery state of charge is less than a fourth predetermined state of charge threshold. The long timer of the long timer module 150 can automatically reset and begin a new countdown after the long timer expires.

In one exemplary embodiment, the long timer of the long timer module 150 prompts the rechargeable battery state of charge module 144 to check the rechargeable battery state of charge and maintain a sufficient charge in the rechargeable battery 118 to send a long range transmission. More specifically, the long timer module 150 prompts the long charge module 158 to perform a long charge 400 on the rechargeable battery 118, when there is time remaining on the long charge timer of the long charge module 158, or prompts the short charge module 156 to perform a short charge 300 of the rechargeable battery 118, when there is no time remaining on the long charge timer of the long charge module 158. For example, time could be remaining on the long charge timer of the long charge module 158, if the previous long charge 400 was exited prior to the expiration of the long charge timer of the long charge module 158. As was described above, the long timer of the long timer module 150 expires at regular intervals and prompts a short charge 300 of rechargeable battery 118 using the short charge module 156 and/or a long charge 400 of the rechargeable battery 118 using the long charge module 158 to ensure that the rechargeable battery state of charge is sufficient to power the transceiver 126 to send a long range transmission. In one exemplary embodiment, the long timer of the long timer module 150 can be a one day timer. However, in other exemplary embodiments, the long timer of the long timer module 150 can be set to another length of time that is appropriate to ensure that the rechargeable battery state of charge is sufficient to power the transceiver 126 to send a long range transmission. In one exemplary embodiment, the fourth predetermined state of charge threshold can be 10%. However, in other exemplary embodiments, the fourth predetermined state of charge threshold can be set at another value that is appropriate to ensure that the rechargeable battery state of charge is sufficient to power the transceiver 126 to send a long range transmission.

In block 404, the long charge method 400 includes charging the rechargeable battery 118 for up to the long predetermined length of time. The long charge module 158 can use the charger 124 and the charging battery 116 to charge the rechargeable battery 118 for up to the long predetermined length of time. The long charge module 158 keeps track of the amount of time remaining in the long predetermined length of time for the long charge 400 by using the long charge timer to count down, while the long charge module 158 is charging the rechargeable battery 118.

The value of the long charge timer is maintained by the long charge module 158, when the long charge 400 is exited prior to the expiration of the long charge timer. Therefore, the long charge timer will resume counting down at the same value, when the long charge module 158 starts a next long charge 400 of the rechargeable battery 118. However, the long charge timer will not resume counting down at the same value, when the value of the long charge timer is set to a different value between the exit of the previous long charge 400 and the start of the next long charge 400. In one exemplary embodiment, when the charging battery 116 is a CR2032 coin cell, the long predetermined length of time tracked by the long charge timer can be 20 minutes to correspond with a maximum safe time to draw recharging electric current from the CR2032 coin cell. However in other exemplary embodiments, the long predetermined length of time can be a different duration of time that is sufficient to charge the rechargeable battery 118 to about a 50% state of charge from about a 10% state of charge. Further, in one exemplary embodiment, the value of the long charge timer of the long charge module 158 can be set to the long predetermined length of time, such as when the value of the counter of the counter module 154 reaches a first predetermined counter value.

In block 406, the long charge method 400 includes ending the long charge 400. The long charge module 158 can end the long charge 400, such as when at least one exit condition is met. The exit conditions for the long charge 400 can include the long predetermined length of time elapsing, any button of the keyless entry device 100 being actuated, the smart trigger being detected by the keyless entry device 100, the stop charge command being received by the keyless entry device 100 from the vehicle 102, the rechargeable battery state of charge exceeding a predetermined third state of charge threshold, and/or the charging battery state of charge being below a predetermined charging battery low charge threshold. In one exemplary embodiment, the long predetermined length of time elapses when the long charge timer of the long charge module 158 expires. Further, in one exemplary embodiment, any button of the keyless entry device 100 is actuated when any of the at least one long range function button 120 or the at least one short range function button 122 is actuated. Further, in one exemplary embodiment, the predetermined third state of charge threshold can be 80% state of charge in order to prevent damage. However, in other exemplary embodiments, other values can be used for the predetermined third state of charge threshold that are not determined to be high enough to cause overheating. Also, in one exemplary embodiment, the predetermined charging battery low charge threshold is 10% in order to prevent damage. However, other values can be used for the predetermined charging battery low charge threshold in other exemplary embodiments that are not determined to be low enough to cause a permanent loss of capacity. Further, in one exemplary embodiment, the value of the predetermined third state of charge threshold is stored in the predetermined rechargeable battery state of charge level 168 of the keyless entry device database 162, and the value of the predetermined charging battery low charge threshold is stored in the predetermined charging battery state of charge level 166 of the keyless entry device database 162.

As was previously stated, in one exemplary embodiment, the charger 124 can be a switching charger circuit that boosts the lower voltage of the charging battery 116 up to a higher voltage sufficient to charge the rechargeable battery 118. Switching charging circuits, by nature, produce interference noise that can interfere with weak low frequency communication between the vehicle 102 and the keyless entry device 100. Therefore, it is preferred for the keyless entry device 100 to receive the long charge start command from the vehicle 102, when the keyless entry device 100 is in a strong low frequency field of the vehicle 102, such as inside the vehicle 102 with all of the doors 108 of vehicle 102 closed. This is opposed to the keyless entry device 100 receiving the long charge start command from the vehicle 102, when the keyless entry device 100 is in a weak low frequency field of the vehicle 102, when a user is holding the keyless entry device 100 while approaching the vehicle 102, or the keyless entry device 100 is inside the vehicle 102 and a door 108 of the vehicle 102 is open. Further, it is preferred for the long charge module 158 to stop charging the rechargeable battery 118 in accordance with a long charge 400, when the strong low frequency field inside the vehicle 102 becomes a weak low frequency field of the vehicle 102, such as when a door 108 of the vehicle 102 is opened.

In one exemplary embodiment, the long charge start command can be sent from the vehicle 102 and received by the keyless entry device 100, such as when the ignition of the vehicle 102 is turned on, all of the doors 108 of the vehicle 102 are closed, and the vehicle 102 exceeds a predetermined speed. In one exemplary embodiment, the predetermined speed can be 20 kph. However, the predetermined speed of the vehicle can be another value in other exemplary embodiments. Further, in one exemplary embodiment, the keyless entry device 100 can receive a long charge stop command from the vehicle 102, thereby causing the long charge module 158 to stop the long charge 400 of the rechargeable battery 118, when the rechargeable battery 118 is undergoing a long charge 400, and a weak low frequency field is present in the vehicle 102, such as when the door 108 of the vehicle 102 is open.

There can be instances in which damage can occur to the rechargeable battery 118, such as due to overheating and/or overcharging. Such damage to the rechargeable battery 118 can result in open circuits or short circuits within the rechargeable battery 118. The short charge module 156 and the long charge module 158 set the trouble flag of the rechargeable battery trouble level 170, when the short charge module 156 and/or the long charge module 158 determines that the rechargeable battery 118 is damaged.

The trouble flag of the rechargeable battery trouble level 170 can be cleared, such as when a power on reset of the keyless entry device 100 occurs and/or the short charge module 156 ends a short charge 300 of the rechargeable battery 118 without determining that the rechargeable battery 118 is damaged. The trouble flag of the rechargeable battery trouble level 170 can also be cleared, such as when the long charge module 158 ends a long charge 400 of the rechargeable battery 118 without determining that the rechargeable battery 118 is damaged, the keyless entry device 100 sends a short range transmission, and/or the keyless entry device 100 sends a long range transmission. In one exemplary embodiment, a power on reset of the keyless entry device 100 can occur, such as when the charging battery 116 is replaced and/or the keyless entry device controller 132 is reset.

V. Powering Method of the Keyless Entry Device

Figure 5:
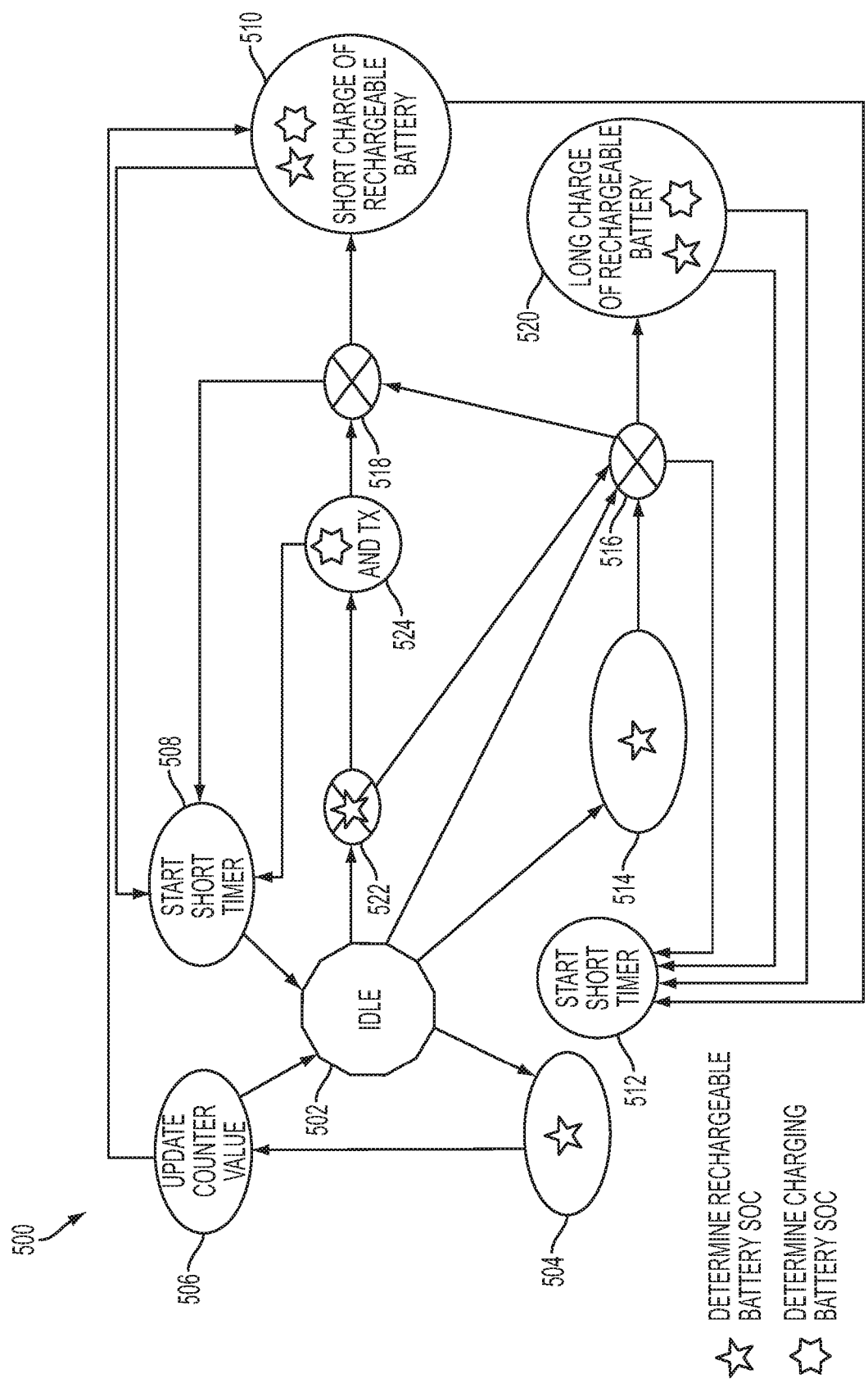
FIG. 5 is a state diagram of a powering method for the keyless entry device of FIGS. 1A-B in accordance with an exemplary embodiment of the present application.

FIG. 5 is a state diagram of a powering method 500 for the keyless entry device 100 of FIGS. 1A-B in accordance with an exemplary embodiment of the present application, which will be described with reference to FIGS. 1A-3.

In state 502, the keyless entry device 100 is idle. The powering method 500 progresses from state 502 to state 504, when the short timer of the short timer module 148 expires. In state 504, the rechargeable battery state of charge is determined. In one exemplary embodiment, the rechargeable battery state of charge can be determined using the rechargeable battery state of charge module 144. In an exemplary embodiment, the rechargeable battery state of charge module 144 can take an open circuit voltage measurement of the rechargeable battery 118 to determine the rechargeable battery state of charge.

After state 504, the powering method 500 progresses to state 506, where the value of the counter of the counter module 154 is updated. In one exemplary embodiment, the counter module 154 can update the value of the counter by decreasing or increasing the value of the counter, based on the rechargeable battery state of charge determined in state 504. In one exemplary embodiment, the counter module 154 decreases the value of the counter, when the rechargeable battery state of charge is greater than a first predetermined state of charge threshold. The counter module 154 increases the value of the counter, when the rechargeable battery state of charge is less than a second predetermined state of charge threshold.

The powering method 500 progresses from state 506 to state 502, when the rechargeable battery state of charge is greater than or equal to the second predetermined threshold. The keyless entry device 100 is idle in state 502.

However, the powering method 500 progresses from state 506 to state 508, when the rechargeable battery state of charge is less than the second predetermined threshold and the temperature of the keyless entry device 100 is outside of the predetermined temperature range. The powering method 500 does not permit a long charge 400 or a short charge 300 to be applied to the rechargeable battery 118, when the temperature of the keyless entry device 100 is outside of the predetermined temperature range.

The short timer of the short timer module 148 is reset and started in state 508. The powering method 500 progresses to state 502 after the short timer is reset and stated in state 508. The setting of the short timer of the short timer module 148 and returning the keyless entry device 100 to an idle state provides an opportunity for the temperature of the keyless entry device 100 to return to a value within the predetermined temperature range, after which the rechargeable battery 118 could then be recharged by applying a long charge 400 or a short charge 300 to the rechargeable battery 118.

Further, the powering method 500 progresses from state 506 to state 510, when the rechargeable battery state of charge is less than the second predetermined threshold and the temperature of the keyless entry device 100 is within the predetermined temperature range. The charging battery state of charge and the rechargeable battery state of charge are determined in state 510. The charging battery state of charge can be determined using the charging battery state of charge module 142, and the rechargeable battery state of charge can be determined using the rechargeable battery state of charge module 144.

The powering method 500 progresses from state 510 to state 508 and sets a trouble flag in the rechargeable battery trouble level 170, when the short charge module 156 determines that the rechargeable battery 118 is damaged. However, a short charge 300 is applied to the rechargeable battery 118 in state 510 for up to a short length of time by the short charge module, when the short charge module 156 determines that the rechargeable battery 118 is not damaged. The short charge module 156 uses the charger 124 and the charging battery 116 to charge to the rechargeable battery 118. The short length of time is variable and is determined by the value of the counter of the counter module 154. More specifically, the short length of time is set equal to a first predetermined short charge time, when the value of the counter is greater than or equal to a first predetermined counter value and less than or equal to a second predetermined counter value. Further, the short length of time is set equal to a second predetermined short charge time, when the value of the counter is greater than or equal to a third predetermined counter value and less than or equal to a fourth predetermined counter value. Additionally, the short length of time is set equal to a third predetermined short charge time, when the value of the counter is greater than or equal to a fifth predetermined counter value and less than or equal to a sixth predetermined counter value. Also, the short length of time is set equal to a fourth predetermined short charge time, when the value of the counter is greater than a seventh predetermined counter value and less than or equal to an eighth predetermined counter value. Further, the short length of time is set equal to a fifth predetermined short charge time, when the value of the counter is greater than a ninth predetermined counter value and less than or equal to a tenth predetermined counter value.

The powering method 500 can end the short charge 300 of the rechargeable battery 118, clear the trouble flag of the rechargeable battery trouble level 170, and progress to state 512, when at least one short charge exit condition is met. The short charge exit conditions can include the short length of time elapsing, any button on the keyless entry device 100 being actuated, a smart trigger being detected by the keyless entry device 100, a stop charge command being received by the keyless entry device 100 from the vehicle 102, the rechargeable battery state of charge exceeding a predetermined third state of charge threshold, and/or the charging battery state of charge being below the predetermined charging battery low threshold.

In state 512, the short timer of the short timer module 148 is reset and started. This setting of the short timer helps to ensure that the rechargeable battery state of charge determined on a regular basis and recharged as needed so that the rechargeable battery 118 can be around a fifth predetermined state of charge threshold. In one exemplary embodiment, the fifth predetermined state of charge threshold can be 50% state of charge. After the short timer of the short timer module 148 is reset and restarted in state 512, the powering method 500 progresses to the idle state 502.

The powering method 500 progresses from state 502 to state 514, when a long timer of the long timer module 150 expires. The rechargeable battery state of charge is determined in state 514 using the rechargeable battery state of charge module 144. The long timer of the long timer module 150 can automatically reset and begin a new countdown after the long timer expires. The expiring of the long timer prompts a determination of the rechargeable battery state of charge and a short charge 300 or a long charge 400 of the rechargeable battery 118. This helps to ensure that the rechargeable battery state of charge determined on a regular basis and recharged as needed, so that the rechargeable battery 118 can provide sufficient electric current to the transceiver 126 as needed to power a long range transmission, such as even when the keyless entry device 100 remains unused for an extended period of time.

The powering method 500 progresses from state 514 to state 516, after the rechargeable battery state of charge is determined in state 514 using the rechargeable battery state of charge module 144.

The powering method 500 progresses from state 516 to state 518, when the value of the long charge timer of the long charge module 158 is '0', to correspond with the expiration of the long charge timer. However, the powering method 500 progresses from state 516 to state 520, when the value of the long charge timer of the long charge module 158 has a value greater than 0 and the temperature of the keyless entry device 100 is within the predetermined temperature range. The long charge timer of the long charge module 158 can have a value greater than 0, such as when an exit condition of a previous long charge 400 was met prior to the expiration of the long charge timer of the long charge module 158.

In state 520, the charging battery state of charge is determined using the charging battery state of charge module 142 and the rechargeable battery state of charge is determined using the rechargeable battery state of charge module 144. The powering method 500 progresses from state 520 to state 512 and sets a trouble flag in the rechargeable battery trouble level 170, when the short charge module determines that the rechargeable battery 118 is damaged. However, a long charge 400 is applied to the rechargeable battery 118 in state 520 for up to a long predetermined length of time, when the long charge module 158 determines that the rechargeable battery 118 is not damaged. The long charge module 158 uses the charger 124 and the charging battery 116 to charge the rechargeable battery 118. The long charge module 158 keeps track of the amount of time remaining in the long predetermined length of time for the long charge 400 by using the long charge timer to count down, while the long charge module 158 is charging the rechargeable battery 118. The value of the long charge timer is maintained by the long charge module 158, when the long charge 400 is exited prior to the expiration of the long charge timer. Therefore, the long charge timer will resume counting down at the same value, when the long charge module 158 starts a next long charge 400 of the rechargeable battery 118, unless the value of the long charge timer is set to a different long predetermined length of time between the exit of the previous long charge 400 of the rechargeable battery 118 by the long charge module 158, and the start of the next long charge 400 of the rechargeable battery 118 by the long charge module 158.

The powering method 500 can end the long charge 400 of the rechargeable battery 118, clear the trouble flag of the rechargeable battery trouble level 170, and progress to state 512, when at least one long charge exit condition is met. The exit conditions for the long charge 400 can include the long predetermined length of time elapsing, any button of the keyless entry device 100 being actuated, a smart trigger being detected by the keyless entry device 100, a stop charge command being received by the keyless entry device 100 from the vehicle 102, the rechargeable battery state of charge exceeding a predetermined third state of charge threshold, and/or the charging battery state of charge being below a predetermined charging battery low charge threshold. In one exemplary embodiment, the long predetermined length of time elapses, when the long charge timer of the long charge module 158 expires.

The method progresses from state 502 to state 516, when the start command is received by the keyless entry device 100 from the vehicle 102. In one exemplary embodiment, the vehicle 102 can send the smart charge start command to the keyless entry device 100, such as when all of the doors 108 of the vehicle 102 are closed and the speed of the vehicle has exceeded the predetermined speed since the last ignition cycle of the vehicle 102.

The powering method 500 progresses from state 502 to state 522, when any button of the keyless entry device 100 is actuated or keyless entry device 100 receives a smart command from the vehicle 102. The rechargeable battery state of charge is determined using the rechargeable battery state of charge module 144 in state 522. The method progresses from state 522 to state 524, when the rechargeable battery state of charge is greater than or equal to the fourth predetermined state of charge threshold and the trouble flag of the rechargeable battery trouble level 170 is not set, or the least one short range function button 122 was actuated in state 502 and the trouble flag of the rechargeable battery trouble level 170 is set.

The method progresses from state 522 to state 516, sets the long charge timer to the long predetermined length of time, and provides feedback to the user via the at least one feedback indicator 134 indicating that the keyless entry device 100 cannot communicate with the vehicle 102 due to the low state of charge or damage to the rechargeable battery 118, when the rechargeable battery state of charge is less than the fourth predetermined state of charge threshold.

In state 524, the charging battery state of charge is determined using the charging battery state of charge module 142, and the short range function or long range function corresponding to the at least one short range function button 122 or the at least one long range function button 120 actuated in state 502 is transmitted to the vehicle 102 using the transceiver 126. The transceiver 126 receives electric current from the charging battery 116 to send the transmission, when the transmission is a short range transmission corresponding to the at least one short range function button 122 actuated in state 502. The transceiver 126 receives electric current from the rechargeable battery 118 to send the transmission, when the transmission is a long range transmission corresponding to the at least one long range function button 120 actuated in state 502. The transceiver 126 will only transmit a short range function in state 524, when the trouble flag of the rechargeable battery trouble level 170 is set. The powering method 500 progresses from state 524 to state 508 and clears the trouble flag of the rechargeable battery trouble level 170, when the transmission sent in state 524 is a short range transmission. However, the powering method 500 progresses from state 524 to state 518, when the transmission sent in state 524 is a long range transmission.

The powering method 500 progresses from state 518 to state 508, when the temperature of the keyless entry device 100 is outside of the predetermined temperature range, or the rechargeable battery state of charge is greater than or equal to the predetermined third state of charge threshold. However, the method progresses from state 518 to state 510, when the temperature of the keyless entry device 100 is within the predetermined temperature range and the rechargeable battery state of charge is less than the predetermined third state of charge threshold.

As can be seen powering method 500, strives to keep the rechargeable battery state of charge to as close to 50% as possible. Further, the electric current provided to rechargeable battery 118 by charger 124 during the long charge 400 and short charge 300 is equal to a predetermined electric current flow rate. In one exemplary embodiment, the predetermined electric current flow rate can be 5.5 mA. However, different predetermined electric current flow rate value can be selected in other exemplary embodiments to balance the need of the rechargeable battery 118, while minimizing the constant electric current draw on the charging battery 116.

VI. Examples of Powering the Keyless Entry Device

A. Powering the Keyless Entry Device when the Keyless Entry Device is Used in a Normal Periodic Fashion FIG. 6 is a depiction of an exemplary path of the powering method 500 of FIG. 5, when the keyless entry device 100 of FIGS. 1A-B is used in a normal, periodic fashion, in accordance with an exemplary embodiment of the present application, which will be described with reference to FIGS. 1A-B and 3-5.

Figure 6:
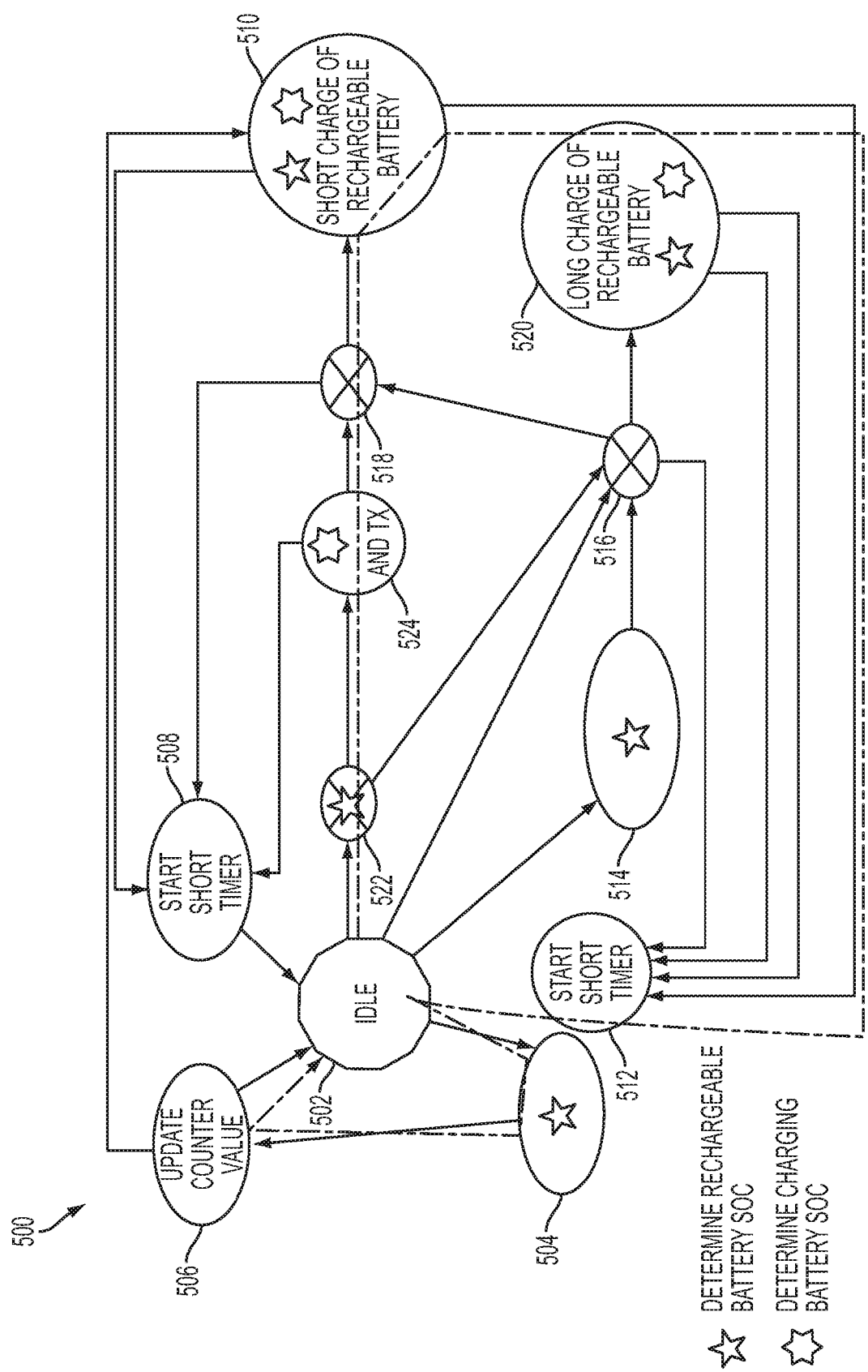
FIG. 6 is a depiction of an exemplary path of the powering method of FIG. 5, when the keyless entry device of FIGS. 1A-B is used in a normal, periodic fashion in accordance with an exemplary embodiment of the present application.

In the powering method 500 of FIG. 6, the powering method 500 leaves idle state 502 and proceeds to state 522, when the at least one long range function button 120 of the keyless entry device 100 is actuated in a normal non-repetitive fashion. The rechargeable battery 118 state of charge is determined by the rechargeable battery state of charge module 144 in state 522. The powering method 500 proceeds from state 522 to state 524 since the rechargeable battery state of charge is greater than or equal to the fourth predetermined state of charge threshold and the trouble flag of the rechargeable battery trouble level 170 is not set. The charging battery state of charge is determined in state 524, using the charging battery state of charge module 142. Further, in state 524, a long range transmission is sent to the vehicle 102 of the long range function corresponding to the at least one long range function button 120 actuated in state 502. The long range transmission is sent from the keyless entry device 100 to the vehicle 102 via the transceiver 126 using electric current from the rechargeable battery 118.

The powering method 500 progresses from state 524 to state 518, since the transmission sent in state 524 was a long range transmission. The method progresses from state 524 to state 510, since the temperature of the keyless entry device 100 is within the predetermined temperature range and the rechargeable battery state of charge is less than the predetermined third state of charge threshold.

The charging battery state of charge and a rechargeable battery state of charge are determined in state 510. The charging battery state of charge can be determined using the charging battery state of charge module 142, and the rechargeable battery state of charge can be determined using the rechargeable battery state of charge module 144. Further, in state 510, a short charge 300 is applied to the rechargeable battery 118 to recover the charge that was used to power the transceiver 126 in the form of electric current, while sending the long range transmission in state 524. The short charge module 156 uses the charger 124 and the charging battery 116 to charge to the rechargeable battery 118. The powering method 500 progresses from state 510 to state 512 and clears the trouble flag of the rechargeable battery trouble level 170, when at least one exit condition of the short charge 300 is met.

In state 512, the short timer of the short timer module 148 is reset and started. After the short timer of the short timer module 148 is reset and restarted in state 512, the powering method 500 progresses to the idle state 502. The powering method 500 progresses from state 502 to state 504, when the short timer of the short timer module 148 expires.

In state 504, a rechargeable battery state of charge is determined. In one exemplary embodiment, the rechargeable battery state of charge can be determined using the rechargeable battery state of charge module 144. In an exemplary embodiment, the rechargeable battery state of charge module 144 can take an open circuit voltage measurement of the rechargeable battery 118 to determine the rechargeable battery state of charge.

After state 504, the powering method 500 progresses to state 506, where the value of the counter of the counter module 154 is updated. In one exemplary embodiment, the counter module 154 can update the value of the counter by decreasing or increasing the value of the counter, based on the rechargeable battery state of charge taken in state 504.

The powering method 500 progresses from state 506 to state 502, when the rechargeable battery state of charge is greater than or equal to the second predetermined threshold. The keyless entry device 100 is idle in state 502.

Therefore, as can be seen, in normal daily operation of the keyless entry device 100, the powering method 500 provides the rechargeable battery 118 with an amount of charge sufficient to recover the amount of charge that was used to send the long range transmission in state 524, while maintaining the rechargeable battery state of charge as close as possible to the fifth predetermined state of charge threshold.

Figure 7:
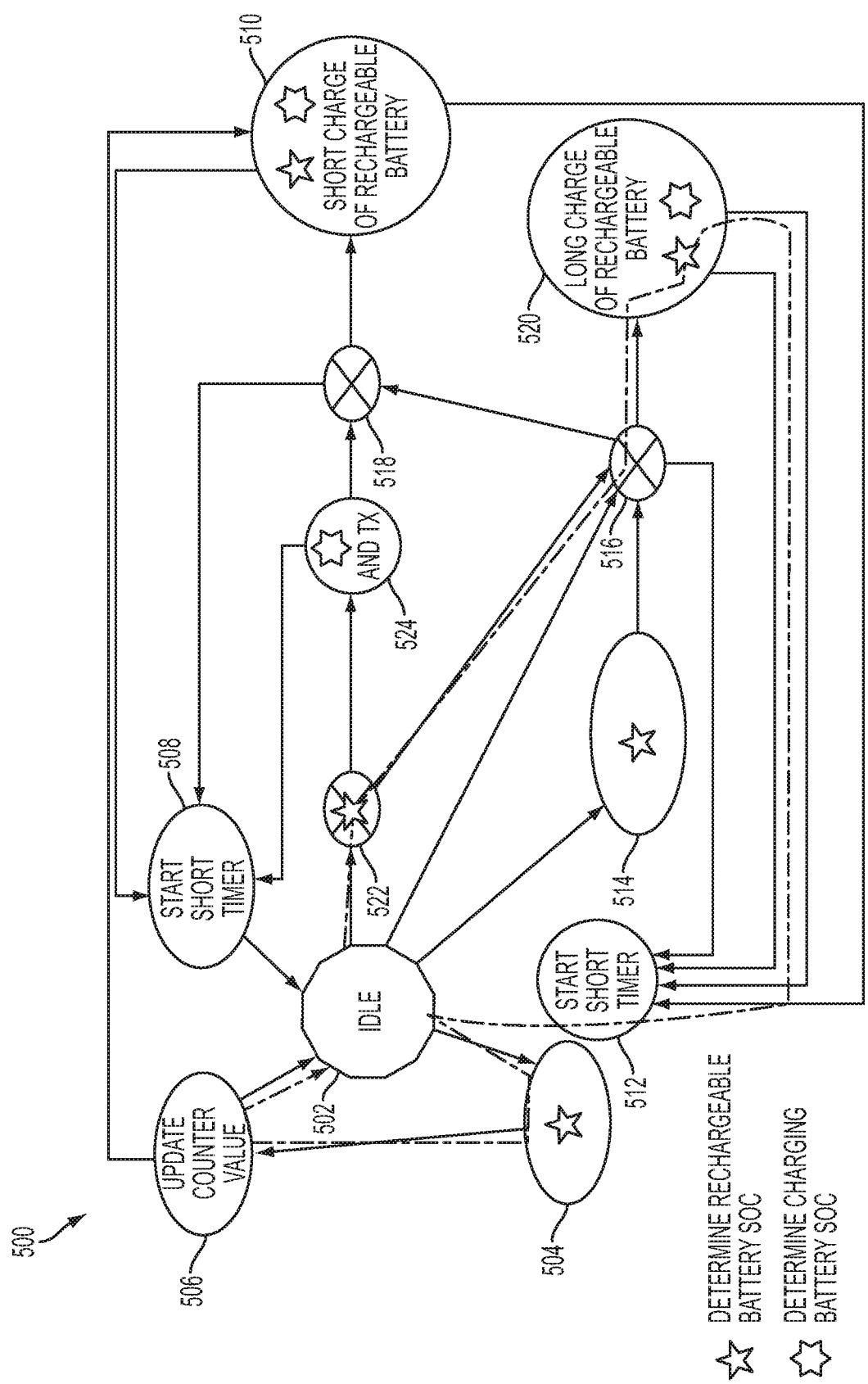
FIG. 7 is a depiction of an exemplary path of the powering method of FIG. 5, when the buttons of the keyless entry device of FIGS. 1A-B are constantly actuated in accordance with an exemplary embodiment of the present application.

B. Powering the Keyless Entry Device when the Buttons of the Keyless Entry Device are Constantly Actuated FIG. 7 is a depiction of an exemplary path of the powering method 500 of FIG. 5, when the buttons of the keyless entry device 100 of FIGS. 1A-B are constantly actuated (e.g. several hundred presses), in accordance with an exemplary embodiment of the present application, which will be described with reference to FIGS. 1A-3 and 5. More specifically, in this example, the at least one long range function button 120 has been actuated numerous times, which has resulted in the keyless entry device 100 transmitting or attempting to transmit several long range transmissions in response to each button press, thereby causing the rechargeable battery to have a state of charge that is less than the fourth predetermined state of charge threshold.

In the powering method 500 of FIG. 7, the powering method 500 leaves idle state 502 and proceeds to state 522, when the at least one long range function button 120 is actuated in a repetitive fashion. The rechargeable battery state of charge is determined using the rechargeable battery state of charge module 144 in state 522.

The powering method 500 proceeds from state 522 to state 516, sets the long charge timer to the long predetermined length of time, and provides feedback to the user via the at least one feedback indicator 134 indicating that the keyless entry device 100 cannot communicate with the vehicle 102, due to the low rechargeable battery state of charge, since the rechargeable battery state of charge is less than the fourth predetermined state of charge threshold. Thereby, the RF transmission is actively stopped, and the user is shown "no communication" feedback, since the long range transmission is no longer possible due to the rechargeable battery state of charge.

The powering method 500 progresses from state 516 to state 520, because the value of the long charge timer of the long charge module 158 has a value greater than 0 and the temperature of the keyless entry device 100 is within the predetermined temperature range, which is an ideal temperature range for charging the rechargeable battery 118. In state 520, the charging battery state of charge is determined using the charging battery state of charge module 142 and the rechargeable battery state of charge is determined using the rechargeable battery state of charge module 144. Also, a long charge 400 is applied using the long charge module 158 to the rechargeable battery 118 in state 520 for up to a long predetermined length of time. The long charge module 158 uses the charger 124 and the charging battery 116 to charge to the rechargeable battery 118. The powering method 500 ends the long charge 400 of the rechargeable battery 118, clears the trouble flag of the rechargeable battery trouble level 170, and progresses to state 512, when the long charge timer of the long charge module 158 expires.

It is noted that if the temperature of the keyless entry device 100 was not within the predetermined temperature range in state 516, the expiration of the long timer of the long timer module 150 will allow charging of the rechargeable battery 118, when the keyless entry device 100 has warmed or cooled to within the predetermined temperature range.

In state 512, the short timer of the short timer module 148 is reset and started. After the short timer of the short timer module 148 is reset and restarted in state 512, the powering method 500 progresses to the idle state 502. The powering method 500 remains in state 502 until the short timer of the short timer module 148 expires, and then progresses to state 504.

In state 504, a rechargeable battery state of charge is determined. In one exemplary embodiment, the rechargeable battery state of charge can be determined using the rechargeable battery state of charge module 144. After the rechargeable battery state of charge is determined in state 504, the powering method 500 progresses to state 506, where the value of the counter of the counter module 154 is updated. Due to the long recharge 400 in state 520, the method progresses from state 506 to state 502, because the rechargeable battery state of charge is greater than the second predetermined threshold.

C. Powering the Keyless Entry Device when the Keyless Entry Device is in Storage FIG. 8 is a depiction of an exemplary path of the powering method 500 of FIG. 5, when the keyless entry device 100 of FIGS. 1A-B is in storage in accordance with an exemplary embodiment of the present application, which will be described with reference to FIGS. 1A-3 and 5.

More specifically, sometimes a vehicle 102 has only one user, but the vehicle 102 comes with two keyless entry devices 100. In such instances, one of the keyless entry devices 100 can be stored in a drawer and not used for months. During storage, the rechargeable battery 118 of the keyless entry device 100 experiences self-consumption and internal storage discharge. This self-consumption and internal storage discharge can cause the rechargeable battery 118 charge to run out of charge before the charging battery 116 runs out of charge. Damage to the rechargeable battery 118 can result over the course of time from the rechargeable battery 118 running out of charge. Further, the rechargeable battery 118 cannot provide sufficient current to the transceiver 126 to send long range transmissions, when the rechargeable battery 118 has run out of charge. Therefore, a long timer of the long timer module 150 can be used to regularly wake up the keyless entry device 100, prompt for the determination of the rechargeable battery state of charge using the rechargeable battery state of charge module 144, and then give a small boost of power to the rechargeable battery 118 using the charger 124 and charging battery 116, in an effort to keep the rechargeable battery 118 in a target state of charge zone. In one exemplary embodiment, the target state of charge zone can be between 10% and 90% state of charge, in an effort to keep the rechargeable battery state of charge as close to 50% as possible.

Figure 8:
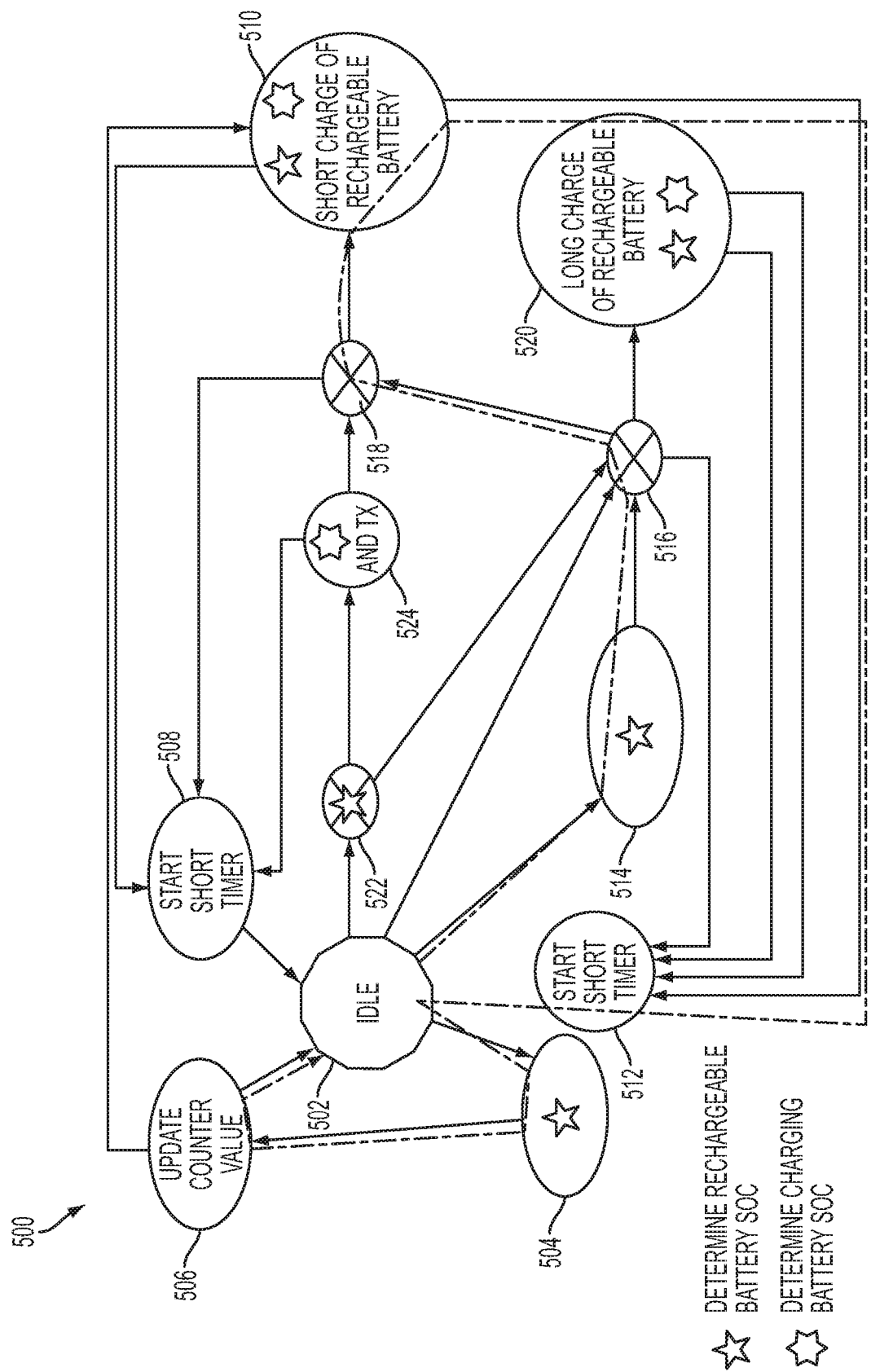
FIG. 8 is a depiction of an exemplary path of the powering method of FIG. 5, when the keyless entry device of FIGS.

In the powering method 500 of FIG. 8, since the keyless entry device 100 is sitting unused in this example, the powering method 500 leaves idle state 502 and progress to state 514, once the long timer of the long timer module 150 expires.

The rechargeable battery state of charge is determined in state 514 using the rechargeable battery state of charge module 144. The long timer of the long timer module 150 can automatically reset and begin a new countdown after the long timer expires. The expiring of the long timer can prompt for the determination of the rechargeable battery state of charge by the rechargeable battery state of charge module 144 and a short charge 300 or a long charge 400 of the rechargeable battery 118, which helps to ensure that the rechargeable battery state of charge is determined on a regular basis and recharged as needed, so that the rechargeable battery 118 can provide sufficient electric current to the transceiver 126 such as when needed to power a long range transmission, even when the keyless entry device 100 remains unused for an extended period of time.

The powering method 500 progresses from state 514 to state 516, after the rechargeable battery state of charge is determined in state 514 using the rechargeable battery state of charge module 144. The powering method 500 then progresses from state 516 to state 518, since the value of the long charge timer of the long charge module 158 is 0. The method then progresses from state 518 to state 510, since the temperature of the keyless entry device 100 is within the predetermined temperature range and the rechargeable battery state of charge is less than the predetermined third state of charge threshold.

The charging battery state of charge and a rechargeable battery state of charge are determined in state 510. The charging battery state of charge can be determined using the charging battery state of charge module 142, and the rechargeable battery state of charge can be determined using the rechargeable battery state of charge module 144. Further, in state 510, the short charge 300 is applied to the rechargeable battery 118 for up to a short length of time by the short charge module 156, since the rechargeable battery 118 is not damaged. The short charge module 156 uses the charger 124 and the charging battery 116 to charge to the rechargeable battery 118. The powering method 500 ends the short charge 300 of the rechargeable battery 118, clears the trouble flag of the rechargeable battery trouble level 170, and progresses to state 512, when at least one short charge exit condition is met (e.g. the short length of time elapses).

In state 512, the short timer of the short timer module 148 is reset and started. After the short timer of the short timer module 148 is reset and restarted in state 512, the powering method 500 progresses to the idle state 502. The powering method 500 remains in state 502 until the short timer of the short timer module 148 expires, and then progresses to state 504.

In state 504, a rechargeable battery state of charge is determined. In one exemplary embodiment, the rechargeable battery state of charge can be determined using the rechargeable battery state of charge module 144. After the rechargeable battery state of charge is determined in state 504, the powering method 500 progresses to state 506, where the value of the counter of the counter module 154 is updated. Due to the long recharge 400 in state 520, the method progresses from state 506 to state 502, because the rechargeable battery state of charge is greater than the second predetermined threshold.

Therefore, the powering method 500 of the keyless entry device 100 can keep the rechargeable battery 118 in a target state of charge zone, such as when the keyless entry device 100 is in storage or not used for a long period of time, through the use of the long timer of the long timer module 150 and the short charge 300. Further, the long timer of the long timer module 150 can be used to regularly wake up the keyless entry device 100, at which point a determination of the rechargeable battery state of charge can be made, and a small boost of power can be provided to the rechargeable battery 118 if needed.

Thus, as has been shown above, the powering method 500 can be used to charge a rechargeable battery 118 of the keyless entry device 100 using a charger 124 and a charging battery 116. The rechargeable battery 118 can provide electric current to the transceiver 126, such as when sending long range transmissions from the keyless entry device 100 to the vehicle 102. The charging battery 116, can provide electric current to the transceiver 126, such as when sending short range transmissions from the keyless entry device 100 to the vehicle 102. The powering method 500 can be used with other systems and embodiments besides those shown herein, such as other portable electronic devices which periodically require large bursts of electric current. The other portable electronic devices can include, but are not limited to, cell phones and digital cameras.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method for powering a keyless entry device for a vehicle, comprising:
   providing the keyless entry device having a charging battery, a rechargeable battery, at least one long range function button for a long range function, and at least one short range function button for a short range function;

charging the rechargeable battery using the charging battery;

sending a short range transmission from the keyless entry device to the vehicle using at least one of: the charging battery and the rechargeable battery, when the short range function is selected using the at least one short range function button; and sending a long range transmission from the keyless entry device to the vehicle using at least one of: the charging battery and the rechargeable battery, when the long range function is selected using the at least one long range function button, wherein the charging battery has a charging battery state of charge, the rechargeable battery has a larger burst current delivery capacity than the charging battery, and the rechargeable battery has a rechargeable battery state of charge;

wherein charging the rechargeable battery using the charging battery includes determining a short length of time of the charging using a value of a counter of the keyless entry device;

wherein the value of the counter is decreased, when the rechargeable battery state of charge is greater than a first predetermined state of charge threshold, and the value of the counter is increased, when the rechargeable battery state of charge is less than a second predetermined state of charge threshold; and wherein the short length of time of the charging is equal to a first predetermined short charge time, when the value of the counter is greater than or equal to a first predetermined counter value and less than or equal to a second predetermined counter value, and the short length of time of the charging is equal to a second predetermined short charge time, when the value of the counter is greater than or equal to a third predetermined counter value and less than or equal to a fourth predetermined counter value; and wherein charging the rechargeable battery using the charging battery is stopped, when at least one of the following occurs: the short length of time has elapsed, any button of the keyless entry device is actuated, a smart trigger is detected by the keyless entry device, a stop charge command is received by the keyless entry device from the vehicle, the rechargeable battery state of charge exceeds a predetermined third state of charge threshold, or the charging battery state of charge is below a predetermined charging battery low charge threshold.

2. The method for powering the keyless entry device for the vehicle of claim 1, wherein charging the rechargeable battery using the charging battery includes charging the rechargeable battery for up to a long predetermined length of time, when at least one of the following occurs:

the keyless entry device is present in the vehicle and the keyless entry device receives a predetermined charge command from the vehicle;

the rechargeable battery state of charge is below a predetermined rechargeable battery low charge threshold; or a long timer of the keyless entry device elapses, wherein charging the rechargeable battery using the charging battery is stopped, when at least one of the following occurs:

the long predetermined length of time elapses, any button of the keyless entry device is actuated, the smart trigger is detected by the keyless entry device, the stop charge command is received by the keyless entry device from the vehicle, the rechargeable battery state of charge exceeds the predetermined third state of charge threshold, or the charging battery state of charge is below the predetermined charging battery low charge threshold.

3. The method for powering the keyless entry device for the vehicle of claim 1, further comprising:

powering off an axis of a multi-axis antenna of the keyless entry device, when the keyless entry device is in a storage condition; and disabling the long range transmission, when the rechargeable battery is damaged.

4. The method for powering the keyless entry device for the vehicle of claim 3, wherein the short range function includes at least one of:

unlocking a door of the vehicle, unlocking all of the doors of the vehicle, releasing a trunk of the vehicle, releasing a tail gate of the vehicle, and enabling a panic function of the vehicle; and the long range function includes at least one of starting an engine of the vehicle, stopping the engine of the vehicle, confirming a status of the engine of the vehicle, and locking the vehicle.

5. The method for powering the keyless entry device for the vehicle of claim 1, further comprising disabling charging the rechargeable battery when a temperature measurement provided by a temperature sensor falls outside of a predetermined temperature range.

6. The method for powering the keyless entry device for the vehicle of claim 1, further comprising providing feedback to a user via a feedback indicator indicating that the keyless entry device cannot communicate with the vehicle.

7. A non-transitory computer-readable storage medium storing executable code for powering a keyless entry device for a vehicle, the code when executed by a processor, performs an action comprising:

charging a rechargeable battery using a charging battery;

sending a short range transmission from the keyless entry device to the vehicle using at least one of: the charging battery and the rechargeable battery, when the short range function is selected using at least one short range function button; and sending a long range transmission from the keyless entry device to the vehicle using at least one of: the charging battery and the rechargeable battery, when the long range function is selected using at least one long range function button, wherein the charging battery has a charging battery state of charge, the rechargeable battery has a rechargeable battery state of charge, and the rechargeable battery has a larger burst current delivery capacity than the charging battery, wherein charging the rechargeable battery using the charging battery includes determining a short length of time of the charging using a value of a counter of the keyless entry device;

wherein the short length of time of the charging is equal to a first predetermined short charge time, when the value of the counter is greater than or equal to a first predetermined counter value and less than or equal to a second predetermined counter value, and the short length of time of the charging is equal to a second predetermined short charge time, when the value of the counter is greater than or equal to a third predetermined counter value and less than or equal to a fourth predetermined counter value; and wherein charging the rechargeable battery using the charging battery is stopped, when at least one of the following occurs: the short length of time has elapsed, any button of the keyless entry device is actuated, a smart trigger is detected by the keyless entry device, a stop charge command is received by the keyless entry device from the vehicle, the rechargeable battery state of charge exceeds a predetermined third state of charge threshold, or the charging battery state of charge is below a predetermined charging battery low charge threshold.

8. The non-transitory computer-readable storage medium storing executable code for powering the keyless entry device for the vehicle of claim 7, wherein charging the rechargeable battery using the charging battery includes charging the rechargeable battery for up to a long predetermined length of time, when at least one of the following occurs:
the keyless entry device is present in the vehicle and the keyless entry device receives a predetermined charge command from the vehicle;
the rechargeable battery state of charge is below a predetermined rechargeable battery low charge threshold; or
a long timer of the keyless entry device elapses, wherein charging the rechargeable battery using the charging battery is stopped, when at least one of the following occurs:
the long predetermined length of time elapses, any button of the keyless entry device is actuated, the smart trigger is detected by the keyless entry device, the stop charge command is received by the keyless entry device from the vehicle, the rechargeable battery state of charge exceeds the predetermined third state of charge threshold, or the charging battery state of charge is below the predetermined charging battery low charge threshold.

9. The non-transitory computer-readable storage medium storing executable code for powering the keyless entry device for the vehicle of claim 7,
wherein the code when executed performs the additional action of powering off an axis of a multi-axis antenna of the keyless entry device, when the keyless entry device is in a storage condition; and
disabling the long range transmission, when the rechargeable battery is damaged.

10. The non-transitory computer-readable storage medium storing executable code for powering the keyless entry device for the vehicle of claim 7,
wherein the short range function includes at least one of unlocking a door of the vehicle, unlocking all of the doors of the vehicle, releasing a trunk of the vehicle, releasing a tail gate of the vehicle, and enabling a panic function of the vehicle; and
the long range function includes at least one of starting an engine of the vehicle, stopping the engine of the vehicle, confirming a status of the engine of the vehicle, and locking the vehicle.

11. The non-transitory computer-readable storage medium storing executable code for powering the keyless entry device for the vehicle of claim 7, the code when executed by the processor, performs an action comprising, disabling charging the rechargeable battery when a temperature measurement provided by a temperature sensor falls outside of a predetermined temperature range.

12. The non-transitory computer-readable storage medium storing executable code for powering the keyless entry device for the vehicle of claim 7, the code when executed by the processor, performs an action comprising, providing feedback to a user via a feedback indicator indicating that the keyless entry device cannot communicate with the vehicle.

13. The non-transitory computer-readable storage medium storing executable code for powering the keyless entry device for the vehicle of claim 12, wherein the feedback is two-way feedback.

14. A keyless entry device for a vehicle, comprising:
a rechargeable battery having a rechargeable battery state of charge for sending at least one of: a short range transmission to the vehicle via a transceiver and a long range transmission to the vehicle via the transceiver;
a charging battery having a charging battery state of charge for sending at least one of: the short range transmission to the vehicle via the transceiver and the long range transmission to the vehicle via the transceiver, wherein the rechargeable battery has a larger burst current delivery capacity than the charging battery;
a battery charger for charging the rechargeable battery using the charging battery;
at least one short range function button that, when actuated, causes at least one of: the charging battery and the rechargeable battery to send the short range transmission via the transceiver;
at least one long range function button that, when actuated, causes at least one of: the charging battery and the rechargeable battery to send the long range transmission via the transceiver; and
a counter module for determining a short length of time of the charging, when charging the rechargeable battery using the charging battery,
wherein a value of the counter decreases, when the rechargeable battery state of charge is greater than a first predetermined state of charge threshold, and the value of the counter increases, when the rechargeable battery state of charge is less than a second predetermined state of charge threshold,
wherein the short length of time of the charging is equal to a first predetermined short charge time, when the value of the counter is greater than or equal to a first predetermined counter value and less than or equal to a second predetermined counter value, and the short length of time of the charging is equal to a second predetermined short charge time, when the value of the counter is greater than or equal to a third predetermined counter value and less than or equal to a fourth predetermined counter value; and
wherein charging the rechargeable battery using the charging battery is stopped, when at least one of the following occurs: the short length of time has elapsed, any button of the keyless entry device is actuated, a smart trigger is detected by the keyless entry device, a stop charge command is received by the keyless entry device from the vehicle via the transceiver, the rechargeable battery state of charge exceeds a predetermined third state of charge threshold, or the charging battery state of charge is below a predetermined charging battery low charge threshold.

15. The keyless entry device for the vehicle of claim 14, further comprising:
a charging battery state of charge module for determining the charging battery state of charge; and
a rechargeable battery state of charge module for determining the rechargeable battery state of charge, wherein the battery charger charges the rechargeable battery for up to a long predetermined length of time, when at least one of the following occurs:

the keyless entry device is present in the vehicle and the keyless entry device receives a predetermined charge command from the vehicle via the transceiver;

the rechargeable battery state of charge is below a predetermined rechargeable battery low charge threshold; or a long timer of the keyless entry device elapses, wherein the battery charger stops charging the rechargeable battery, when at least one of the following occurs:

the long predetermined length of time elapses, any button of the keyless entry device is actuated, the smart trigger is detected by the keyless entry device, the stop charge command is received by the keyless entry device from the vehicle using the transceiver, the rechargeable battery state of charge exceeds the predetermined third state of charge threshold, or the charging battery state of charge is below the predetermined charging battery low charge threshold, wherein the state of charge of the charging battery is determined using the charging battery state of charge module of the keyless entry device and the state of charge of the rechargeable battery is determined using the rechargeable battery state of charge module of the keyless entry device.

16. The keyless entry device for the vehicle of claim 14, further comprising:

a multi-axis antenna;

a storage timer module for determining a storage condition of said keyless entry device, and turning off an axis of said multi-axis antenna, when said storage timer module determines said keyless entry device is in the storage condition; and wherein the long range transmission is disabled, when the rechargeable battery is damaged, wherein the short range function includes at least one of unlocking a door of the vehicle, unlocking all of the doors of the vehicle, releasing a trunk of the vehicle, releasing a tail gate of the vehicle, and enabling a panic function of the vehicle; and the long range function includes at least one of starting an engine of the vehicle, stopping the engine of the vehicle, confirming a status of the engine of the vehicle, and locking the vehicle, wherein the rechargeable battery delivers current to the transceiver through an isolation device.

17. The keyless entry device for the vehicle of claim 14, further comprising a temperature sensor providing a temperature measurement, wherein the keyless entry device disables charging of the rechargeable battery when the temperature measurement falls outside of a predetermined temperature range.

18. The keyless entry device for the vehicle of claim 14, comprising a feedback indicator providing feedback to a user indicating that the keyless entry device cannot communicate with the vehicle.

19. The keyless entry device for the vehicle of claim 18, comprising wherein the feedback is two-way feedback.

20. The keyless entry device for the vehicle of claim 14, wherein the rechargeable battery state of charge module uses an open circuit voltage measurement of the rechargeable battery to determine the rechargeable battery state of charge.

\* \* \* \* \*